United States Patent
Kawauchi

(10) Patent No.: US 9,560,227 B2
(45) Date of Patent: Jan. 31, 2017

(54) IMAGE READER AND COMPUTER-READABLE MEDIUM FOR THE SAME

(71) Applicant: BROTHER KOGYO KABUSHIKI KAISHA, Nagoya-shi, Aichi-ken (JP)

(72) Inventor: Yoshikazu Kawauchi, Nagoya (JP)

(73) Assignee: BROTHER KOGYO KABUSHIKI KAISHA, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/665,281

(22) Filed: Mar. 23, 2015

(65) Prior Publication Data

US 2015/0281488 A1  Oct. 1, 2015

(30) Foreign Application Priority Data

Mar. 31, 2014  (JP) ................. 2014-071271

(51) Int. Cl.
*G06F 15/00*  (2006.01)
*H04N 1/00*  (2006.01)

(52) U.S. Cl.
CPC .................. *H04N 1/0057* (2013.01)

(58) Field of Classification Search
CPC combination set(s) only.
See application file for complete search history.

(56) References Cited

U.S. PATENT DOCUMENTS

2011/0096379 A1* 4/2011 Kurokawa .......... G03G 15/605
                                                        358/498
2011/0194127 A1   8/2011 Nagakoshi et al.
2012/0113487 A1* 5/2012 Murakami .......... H04N 1/0062
                                                        358/498
2013/0099107 A1* 4/2013 Omoto ................ F16C 41/007
                                                        250/231.13
2015/0373209 A1* 12/2015 Aizono ............... H04N 1/0057
                                                        358/498

FOREIGN PATENT DOCUMENTS

JP     3-283968 A     12/1991
JP     2009-016902 A   1/2009
JP     2011-166537 A   8/2011

* cited by examiner

*Primary Examiner* — Helen Q Zong

(74) *Attorney, Agent, or Firm* — Merchant & Gould P.C.

(57) ABSTRACT

An image reader including a conveyor, a first detector, a plurality of second detectors, a reading unit, and a controller configured to perform a control process that includes determining whether second detection information output from the second detectors satisfies a predetermined state, executing a first sequence when determining that the second detection information satisfies the predetermined state, the first sequence including determining whether a conveyed object is in a multi-feed condition based on first detection information output from the first detector, and halting at least one of a conveying operation by the conveyor and a reading operation by the reading unit when determining that the conveyed object is in the multi-feed condition, executing a second sequence when determining that the second detection information does not satisfy the predetermined state, the second sequence including continuing the conveying operation and the reading operation regardless of the first detection information.

11 Claims, 11 Drawing Sheets

SUCCESSFUL DOCUMENT SEPARATION

IMAGE READER AND COMPUTER-READABLE MEDIUM FOR THE SAME

CROSS-REFERENCE TO RELATED APPLICATION

This application claims priority under 35 U.S.C. §119 from Japanese Patent Application No. 2014-071271 filed on Mar. 31, 2014. The entire subject matter of the application is incorporated herein by reference.

BACKGROUND

Technical Field

The following description relates to one or more aspects of an image reading apparatus and a computer-readable medium therefor.

Related Art

An image reader has been known that is provided with a separation conveyance operational mode and a non-separation conveyance operational mode. In the separation conveyance operational mode, when the image reader determines that multi-feed occurs, based on detection information output from a multi-feed detector, the image reader halts conveyance of sheets or continuously conveys the sheets to a sheet discharge unit. Meanwhile, in the non-separation conveyance operational mode, when the multi-feed detector detects a half-folded document sheet, the image reader reads the detected half-folded document sheet. The operational mode is switched between the separation conveyance operational mode and the non-separation conveyance operational mode, through an operation of a changeover switch or an operation of a personal computer (hereinafter referred to as a "PC" in an abbreviation form).

SUMMARY

According to aspects of the present disclosure, an image reader is provided that includes a conveyor configured to perform a conveying operation of conveying a conveyed object in a conveyance direction, the conveyed object being one of a document sheet and a carrier sheet with a document sheet held therein, a first detector configured to output first detection information representing whether the conveyed object is in a multi-feed condition in which the conveyed object overlaps another conveyed object, a plurality of second detectors spaced apart from each other in a direction intersecting the conveyance direction, each second detector being configured to output second detection information representing whether there is an object being conveyed, a reading unit disposed downstream relative to the first detector and the plurality of second detectors in the conveyance direction, the reading unit being configured to perform a reading operation of reading an image of the conveyed object, and a controller configured to perform a control process of controlling the conveying operation by the conveyor and the reading operation by the reading unit, the control process including determining whether the second detection information output from the plurality of second detectors satisfies a predetermined state, executing a first sequence when determining that the second detection information output from the plurality of second detectors satisfies the predetermined state, the first sequence including determining whether the conveyed object is in the multi-feed condition, based on the first detection information output from the first detector, and halting at least one of the conveying operation and the reading operation, when determining that the conveyed object is in the multi-feed condition, executing a second sequence when determining that the second detection information output from the plurality of second detectors does not satisfy the predetermined state, the second sequence including continuing the conveying operation by the conveyor and the reading operation by the reading unit, regardless of the first detection information output from the first detector.

According to aspects of the present disclosure, further provided is an image reader including a conveyance roller configured to rotate to convey a medium to be read, along a conveyance direction, an ultrasonic sensor, a first sensor and a second sensor spaced apart from each other in a direction intersecting the conveyance direction, a reading unit disposed downstream relative to the ultrasonic sensor, the first sensor, and the second sensor in the conveyance direction, and a controller configured to determine whether a time difference between a first timing and a second timing satisfies a predetermined relationship, the first timing being a point of time when the controller receives detection information from the first sensor, the second timing being a point of time when the controller receives detection information from the second sensor, execute a first sequence in response to determining that the time difference between the first timing and the second timing satisfies the predetermined relationship, the first sequence including determining whether multi-feed is occurring based on detection information from the ultrasonic sensor, and stopping at least one of rotation of the conveyance roller and light emission from the reading unit in response to determining that the multi-feed is occurring, and execute a second sequence in response to determining that the time difference between the first timing and the second timing does not satisfy the predetermined relationship, the second sequence including continuing the rotation of the conveyance roller and the light emission from the reading unit regardless the detection information from the ultrasonic sensor.

According to aspects of the present disclosure, further provided is a non-transitory computer-readable medium storing computer-readable instructions that are executable by a processor coupled with an image reader including a conveyance roller configured to rotate to convey a medium to be read, along a conveyance direction, an ultrasonic sensor, a first sensor and a second sensor spaced apart from each other in a direction intersecting the conveyance direction, and a reading unit disposed downstream relative to the ultrasonic sensor, the first sensor, and the second sensor in the conveyance direction, the instructions being configured to, when executed by the processor, cause the processor to determine whether a time difference between a first timing and a second timing satisfies a predetermined relationship, the first timing being a point of time when the processor receives detection information from the first sensor, the second timing being a point of time when the processor receives detection information from the second sensor, execute a first sequence in response to determining that the time difference between the first timing and the second timing satisfies the predetermined relationship, the first sequence including determining whether multi-feed is occurring based on detection information from the ultrasonic sensor, and stopping at least one of rotation of the conveyance roller and light emission from the reading unit in response to determining that the multi-feed is occurring, and execute a second sequence in response to determining that the time difference between the first timing and the second timing does not satisfy the predetermined relationship, the second sequence including continuing the rotation of the conveyance roller and the light emission from the reading unit regardless the detection information from the ultrasonic sensor.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Generally, in reading an easily-damageable sheet or an abnormally-shaped sheet, the easily-damageable sheet or the abnormally-shaped sheet is conveyed and read by the image reader in a state where the easily-damageable sheet or the abnormally-shaped sheet is held in a carrier sheet. The carrier sheet is formed with a plurality of transparent sheets mutually overlapping. When a document sheet sandwiched between the transparent sheets of the carrier sheet is read in the separation conveyance operational mode, the document sheet and the plurality of transparent sheets are conveyed together in an overlapped manner. Therefore, at this time, the image reader might determine that the sheets are conveyed in a multi-feed manner. When determining that the sheets are conveyed in a multi-feed manner, the image reader halts conveyance of the sheets or continuously conveys the sheets to the sheet discharge unit without reading the sheets.

To prevent the image reader from mistakenly identifying a situation where the carrier sheet is being conveyed as occurrence of multi-feed, a user is required to perform a troublesome operation of, e.g., operating the changeover switch of the image reader or operating the PC connected with the image reader to switch between the separation conveyance operational mode and the non-separation conveyance operational mode.

Aspects of the present disclosure are advantageous to provide one or more improved techniques, for an image processing apparatus, which do not need user's troublesome operations for switching the operational mode.

Hereinafter, an illustrative embodiment according to aspects of the present disclosure will be described with reference to the accompanying drawings. In the following description, a front-to-rear direction, a left-to-right direction, and a vertical direction of an image reader 1 of the illustrative embodiment will be defined as shown in FIGS. 1 to 4.

(Mechanical Configuration of Image Reader)

Figure 1:
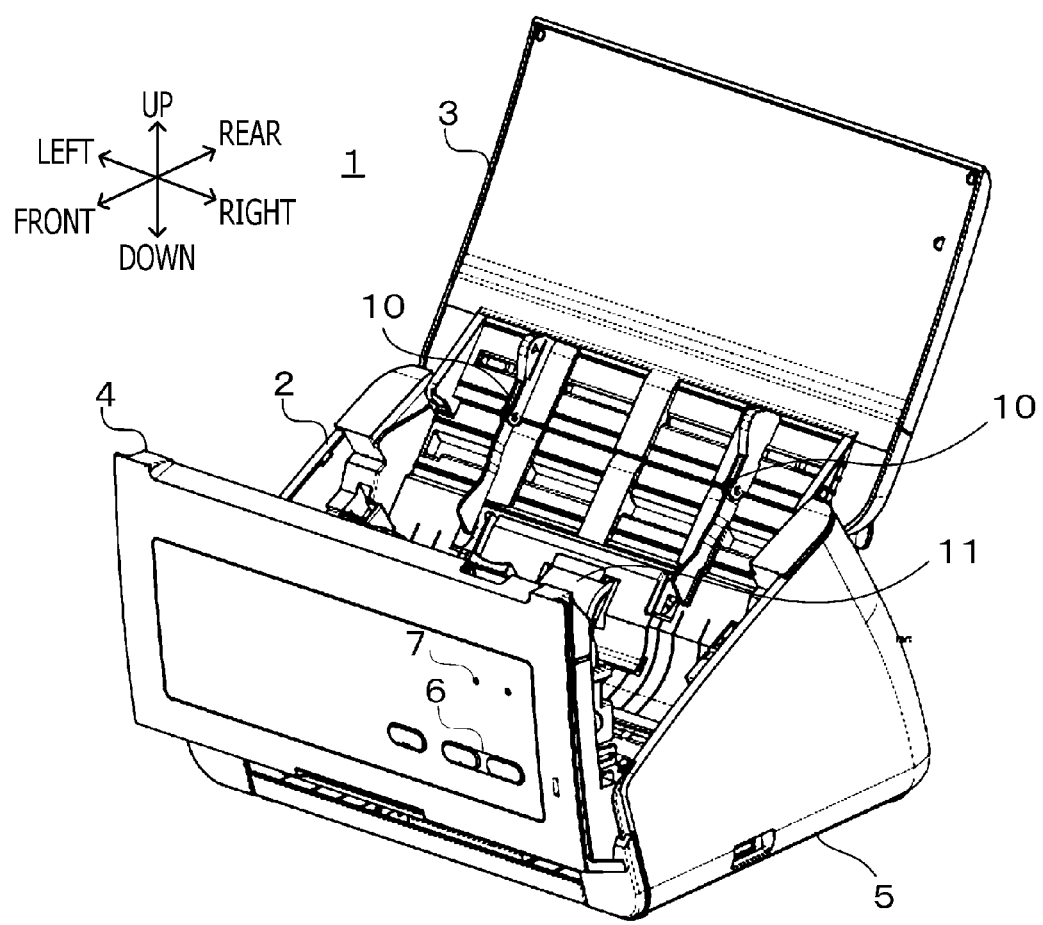
FIG. 1 is a perspective view showing an image reader when an upper portion of a main body thereof is open, in accordance with one or more aspects of the present disclosure.

FIG. 1 is a perspective view showing the image reader 1 when an upper portion 4 of a main body 2 of the image reader 1 is open. The image reader 1 includes the main body 2 and a document tray 3. The main body 2 includes the upper portion 4 and a lower portion 5. The upper portion 4 is attached to the lower portion 5. The upper portion 4 is openable and closable relative to the lower portion 5. The document tray 3 is disposed behind the main body 2. Switches 6 and light-emitting diodes 7 (hereinafter referred to as "LEDs 7") are disposed at the upper portion 4 of the main body 2. The switches 6 are configured to accept user operations. The LEDs 7 are configured to indicate operational states of the image reader 1.

Figure 2:
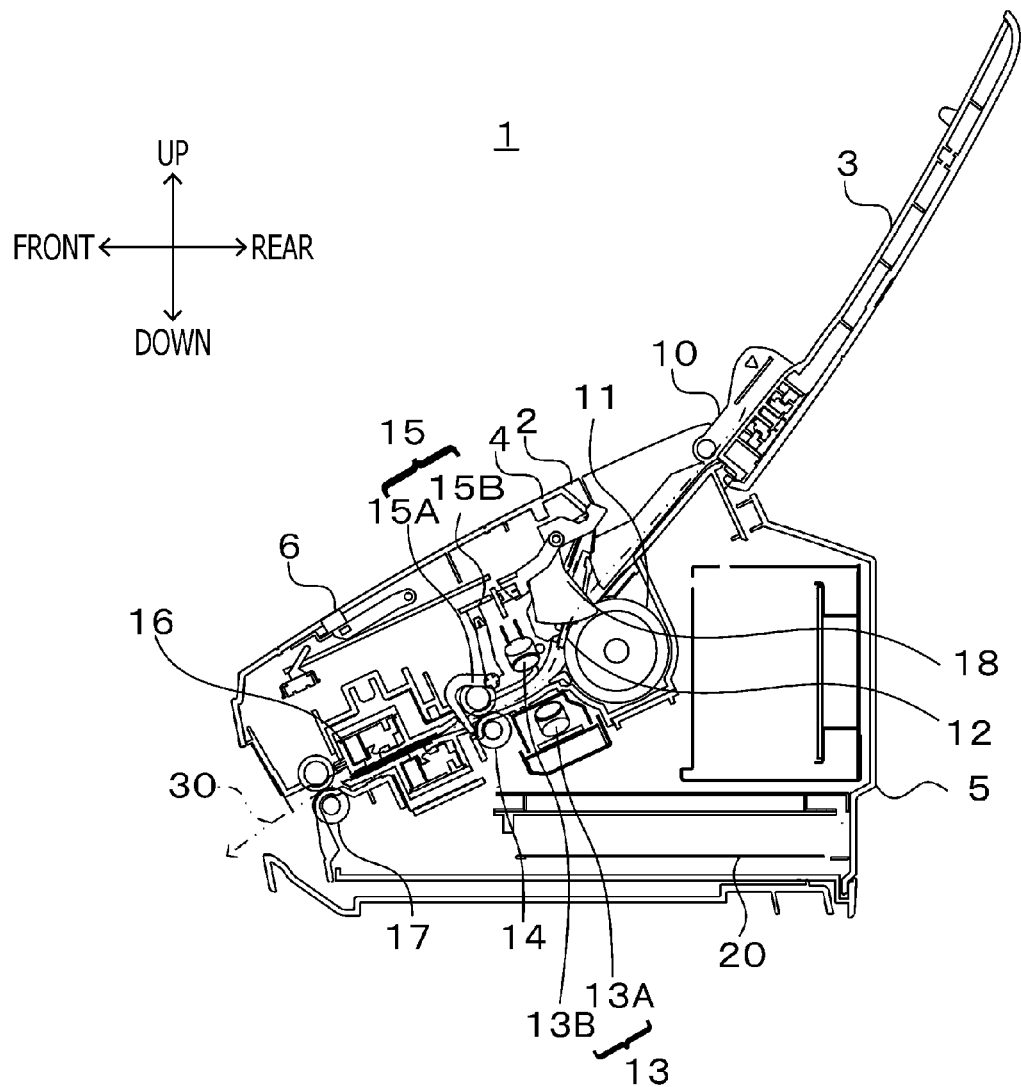
FIG. 2 is a cross-sectional side view showing the image reader in accordance with one or more aspects of the present disclosure.

FIG. 2 is a cross-sectional side view for illustrating a configuration of the image reader 1. A conveyance path 30, along which document sheets are conveyed, is defined between the upper portion 4 and the lower portion 5 of the main body 2. The conveyance path 30 is slanted downward in a direction forward from the document tray 3. In other words, as shown in FIG. 2, the conveyance path 30 is defined between a downward-facing surface of the upper portion 4 and an upward-facing surface of the lower portion 5, when the upper portion 4 is closed relative to the lower portion 5. The document sheets are conveyed forward from the document tray 3 along the conveyance path 30. In FIG. 2, the conveyance path 30 is indicated by an alternate long and two short dashes arrow. An orientation of the arrow exemplifies a conveyance direction. The conveyance direction corresponds to a direction in which the document sheets are conveyed, i.e., a direction from the document tray 3 toward the discharge rollers 17 along the conveyance path 30. Namely, as shown in FIG. 2, the conveyance direction is a direction from an upper rear portion to a lower front portion of the image reader 1. Along the conveyance path 30, there are disposed two side guides 10, a front sensor 18, a pickup roller 11, a document separator 12, a multi-feed detector 13, feed rollers 14, a document detector 15, a reading unit 15, and discharge rollers 17. Further, a controller 20 of the image reader 1 is disposed at the lower portion 5 of the main body 2.

Figure 3:
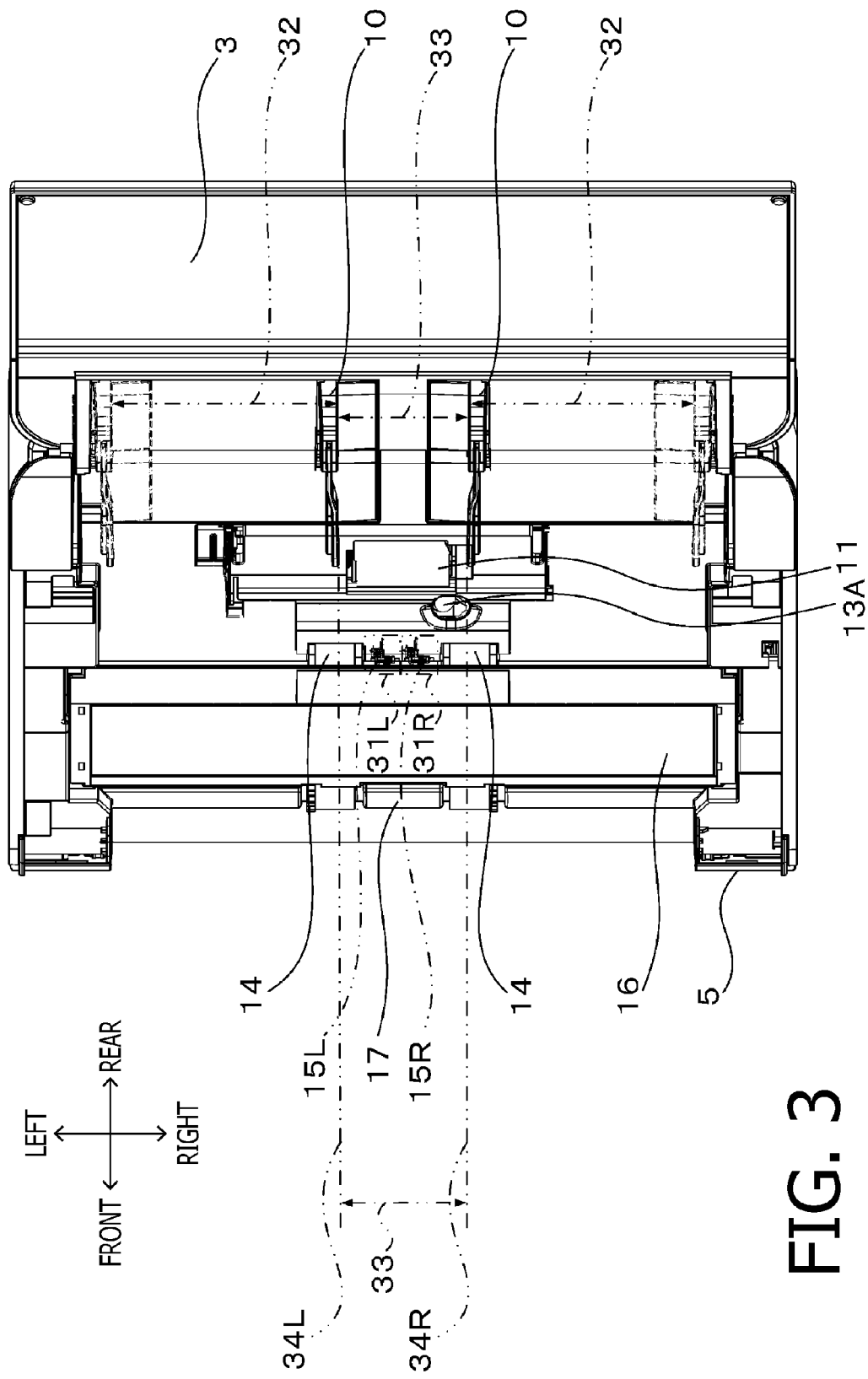
FIG. 3 is a plane view showing the image reader in accordance with one or more aspects of the present disclosure.

As shown in FIG. 3, the two side guides 10 are attached to the document tray 3 to be movable in the left-to-right direction along grooves formed on the document tray 3. The two side guides 10 are positioned the same distance away, in respective different directions along the left-to-right direction, from a middle point of a length of the document tray 3 in the left-to-right direction. Each side guide 10 has a rack (not shown) extending in the left-to-right direction, inside the document tray 3. Inside the document tray 3, a pinion gear (not shown) is provided. Engagement between the pinion gear and the rack of each side guide 10 enables the two side guides 10 to move symmetrically in the left-to-right direction with respect to the middle point of the length of the document tray 3 in the left-to-right direction. When the two side guides 10 are moved in respective different directions along the left-to-right direction, document sheets placed between the two side guides 10 are restricted from moving in the left-to-right direction and guided onto the conveyance path 30 by the two side guides 10. The pickup roller 11 is disposed downstream relative to the document tray 3 in the conveyance direction. The document sheets placed between the two side guides 10, on the document tray 3, are conveyed along the conveyance path 30 by rotation of the pickup roller 11. As shown in FIG. 2, the document separator 12 is a plate-shaped member. The document separator 12 is disposed at the upper portion 4. The document separator 12 faces the pickup roller 11 across the conveyance path 30. Namely, the document separator 12 is a separation pad. The document separator 12 is pressed against the pickup roller 11. The document sheets are pressed by the document separator 12 and separated on a sheet-by-sheet basis by a friction force acting between the sheets and the document separator 12.

The multi-feed detector 13 is disposed downstream relative to the document separator 12 in the conveyance direction. In the illustrative embodiment, the multi-feed detector 13 includes an ultrasonic sensor that includes a receiver 13A and a transmitter 13B. The receiver 13A is disposed at the lower portion 5. The transmitter 13B is disposed at the upper portion 4. The transmitter 13B faces the receiver 13A across the conveyance path 30. Alternatively, the receiver 13A may be disposed at the upper portion 4, and the transmitter 13B may be disposed at the lower portion 5. The feed rollers 14 are disposed downstream relative to the multi-feed detector 13 in the conveyance direction. The feed rollers 14 are configured to feed the document sheets further downstream in the conveyance direction.

As shown in FIG. 3, the document detector 15 includes two document detecting sensors 15L and 15R. In the illustrative embodiment, the document detecting sensors 15L and 15R are disposed at the upper portion 4 of the main body 2 and downstream relative to the feed rollers 14 in the conveyance direction. Hereinafter, the document detecting sensors 15L and 15R may collectively be referred to as the document detector 15, when the sensors 15L and 15R need not be discriminated from each other. In the illustrative embodiment, each of the document detecting sensors 15L and 15R includes a rotatable element 15A and a photo-coupler 15B. The rotatable element 15A is disposed to be rotatable in a direction along the conveyance direction. Namely, the rotatable element 15A is configured to rotate around an axis 15C extending in the left-to-right direction. Since the axis 15C is parallel to the left-to-right direction, it is understood that the rotatable element 15A, when rotating clockwise or counterclockwise, rotates parallel to the conveyance direction. An end portion of the rotatable element 15A protrudes from the upper portion 4 to the conveyance path 30, so as to contact document sheets. When the end portion of the rotatable element 15A comes into contact with a document sheet, the other end portion of the rotatable element 15A comes away from a position to block an optical path of the photo-coupler 15B, such that the rotatable element 15A does not block the optical path of the photo-coupler 15B. A detailed explanation will be provided later about disposition and operations of the document detector 15, with reference to FIGS. 3 and 4.

As shown in FIG. 2, the front sensor 18 is disposed at the upper portion 4 of the main body 2 and upstream relative to the pickup roller 11 in the conveyance direction. In the illustrative embodiment, the front sensor 18 includes a movable element and a photo-coupler. The movable element is disposed to be rotatable in a direction along the conveyance direction. An end portion of the movable element protrudes from the upper portion 4 to the conveyance path 30, so as to contact the document sheets placed on the document tray 3. When the end portion of the movable element comes into contact with a document sheet, the other end portion of the movable element comes away from a position to block an optical path of the photo-coupler, such that the movable element does not block the optical path of the photo-coupler.

The reading unit 16 is disposed downstream relative to the document detector 15 in the conveyance direction. The reading unit 16 includes contact image sensors (hereinafter referred to as "CISs" in an abbreviated form) configured to read images of document sheets being conveyed. In the illustrative embodiment, a main scanning direction and a sub scanning direction of the CISs are the left-to-right direction and the conveyance direction, respectively. The discharge rollers 17 are disposed at the lower portion 5 of the main body 2 and downstream relative to the reading unit 16 in the conveyance direction. The discharge rollers 17 are configured to convey the document sheets of which the images have been read by the reading unit 16, outside from the image reader 1.

FIG. 3 is a plane view of the lower portion 5 of the main body 2 of the image reader 1 in the illustrative embodiment. The upper portion 4 of the main body 2 is not shown in FIG. 3. Although the document detecting sensors 15L and 15R are disposed at the upper portion 4, FIG. 3 does not show the document detecting sensor 15L or 15R but indicates disposition areas 31L and 31R of the document detecting sensors 15L and 15R by alternate long and two short dashes lines, for the sake of explanatory convenience. In FIG. 3, movable areas 32 of the side guides 10 are indicated by alternate long and two short dashes arrows. Further, in FIG. 3, a shortest distance 33 between the two side guides 10 when the two side guides 10 are positioned closest to each other is shown by an alternate long and two short dashes line. Moreover, in FIG. 3, a left end 34L and a right end 34R of a conveyance area defined by the two side guides 10 positioned closest to each other are shown by alternate long and short dashes lines.

Between the left end 34L and the right end 34R of the conveyance area defined by the two side guides 10 when the two side guides 10 are positioned closest to each other, the two document detecting sensors 15L and 15R are arranged along the left-to-right direction perpendicular to the conveyance direction. Further, the two document detecting sensors 15L and 15R are positioned the same distance away, in respective different directions along the left-to-right direction, from the middle point of the length of the document tray 3 in the left-to-right direction.

Figure 4:
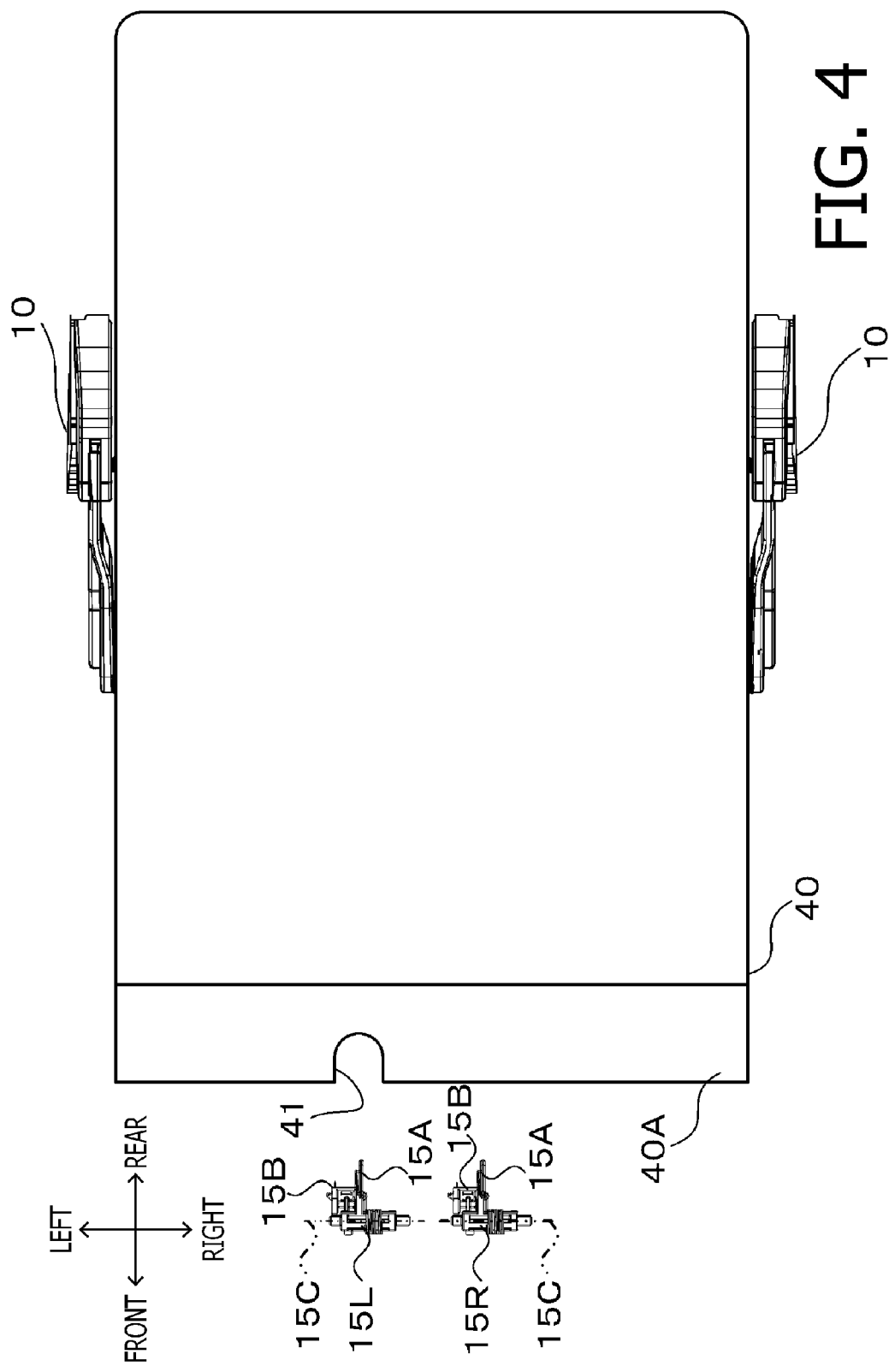
FIG. 4 is a plane view showing a positional relationship between a document detector (document detecting sensors) and a carrier sheet in a left-to-right direction, in accordance with one or more aspects of the present disclosure.

Referring to FIG. 4, an explanation will be provided about a relative positional relationship between the document detector 15 and a carrier sheet 40. The carrier sheet 40 is formed by bonding end portions of two transparent sheets together. The carrier sheet 40 is conveyed with an easily-damageable document sheet or an abnormally-shaped document sheet sandwiched between the two transparent sheets of the carrier sheet 40. A bonded portion of the two transparent sheets is a leading end portion 40A. At the leading end portion 40A, a cutout 41 is formed. The cutout 41 may be formed, e.g., with a length of 10 mm in the conveyance direction of the carrier sheet 40 and a length of 10 mm in the left-to-right direction of the carrier sheet 40. The carrier sheet 40 is conveyed with the leading end portion 40A thereof directed downward in the conveyance direction. When a document sheet held in the carrier sheet 40 (i.e., a document sheet sandwiched between the transparent sheets of the carrier sheet 40) is read, the positions of the two side guides 10 are adjusted by a user, according to the size of the carrier sheet 40. The carrier sheet 40 is placed between the two side guides 10 of which the positions have been adjusted. When the user operates one of the switches 6, the carrier sheet 40 begins to be conveyed. The rotatable element 15A of the document detecting sensor 15R comes into contact with a non-cutout part, where the cutout 41 is not formed, of the leading end portion 40A of the carrier sheet 40. Meanwhile, the rotatable element 15A of the document detecting sensor 15L comes into contact with an edge portion of the cutout 41 formed at the leading end portion 40A of the carrier sheet 40. A detection moment when the document detecting sensor 15L comes into contact with the edge portion of the cutout 41 is later than a detection moment when the document detecting sensor 15R comes into contact with the non-cutout part of the leading end portion 40A. For example, at such a conveyance speed as to enable conveyance of 50 A4-sized sheets per minute, an absolute time difference may be equal to or more than 0.02 seconds between the detection moment when the document detecting sensor 15L comes into contact with the edge portion of the cutout 41 and the detection moment when the document detecting sensor 15R comes into contact with the non-cutout part of the leading end portion 40A. When a document sheet is conveyed without the carrier sheet 40, a detection moment when the rotatable element 15A of the document detecting sensor 15L comes into contact with the document sheet is the same as a detection moment when the rotatable element 15A of the document detecting sensor 15R comes into contact with the document sheet. For example, the same detection moment means that, at such a conveyance speed as to enable conveyance of 50 A4-sized sheets per minute, an absolute time difference may be equal to or less than 0.01 seconds between the detection moment when the document detecting sensor 15L detects the document sheet and the detection moment when the document detecting sensor 15R detects the document sheet. A threshold for determining whether the two detection moments are the same may be changed as needed depending on the conveyance speed. For example, at such a conveyance speed as to enable conveyance of 25 A4-sized sheets per minute, the absolute time difference may be equal to or less than 0.02 seconds between the two detection moments.

(Electrical Configuration of Image Reader)

Figure 5:
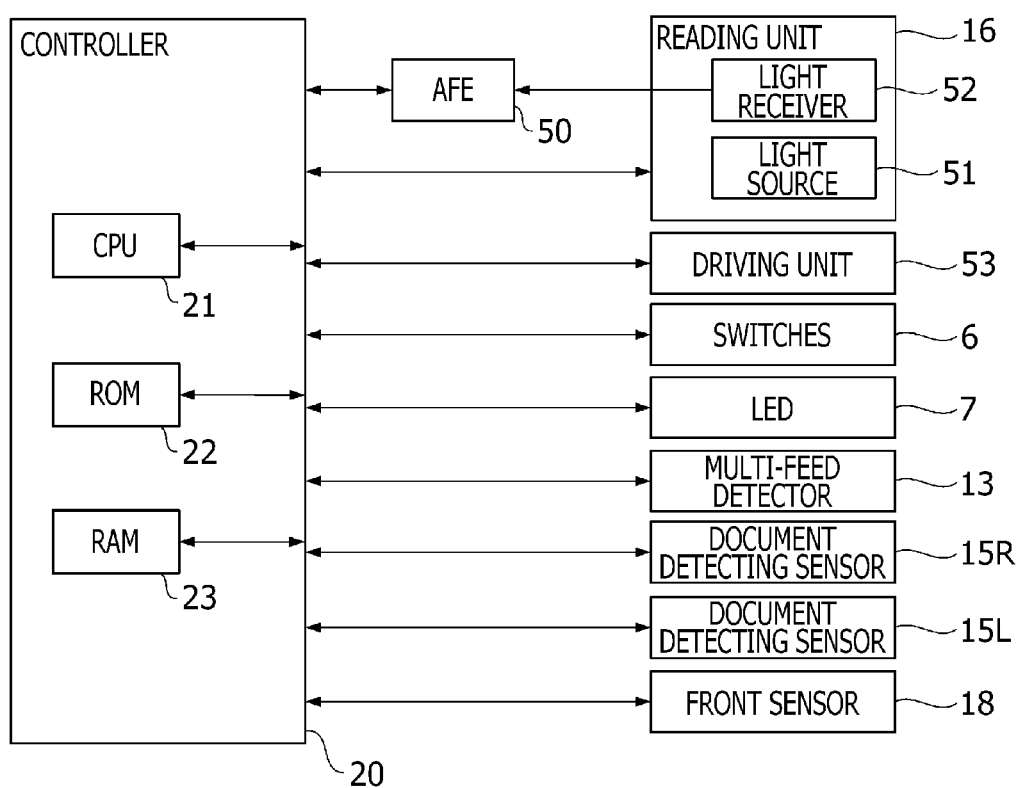
FIG. 5 is a block diagram showing an electrical configuration of the image reader in accordance with one or more aspects of the present disclosure.

FIG. 5 is a block diagram schematically showing an electrical configuration of the image reader 1. The image reader 1 includes the controller 20 configured to take control of operations of conveying and reading document sheets. The controller 20 includes a central processing unit 21 (hereinafter referred to as a "CPU 21"), a read-only memory 22 (hereinafter referred to as a "ROM 22"), and a random access memory 23 (hereinafter referred to as a "RAM 23"). The controller 20 is connected with the switches 6, the LEDs 7, a driving unit 53, a reading unit 16, an analog front end 50 (hereinafter referred to as an "AFE 50"), the multi-feed detector 13, the document detector 15, and the front sensor 18.

Figure 6A:
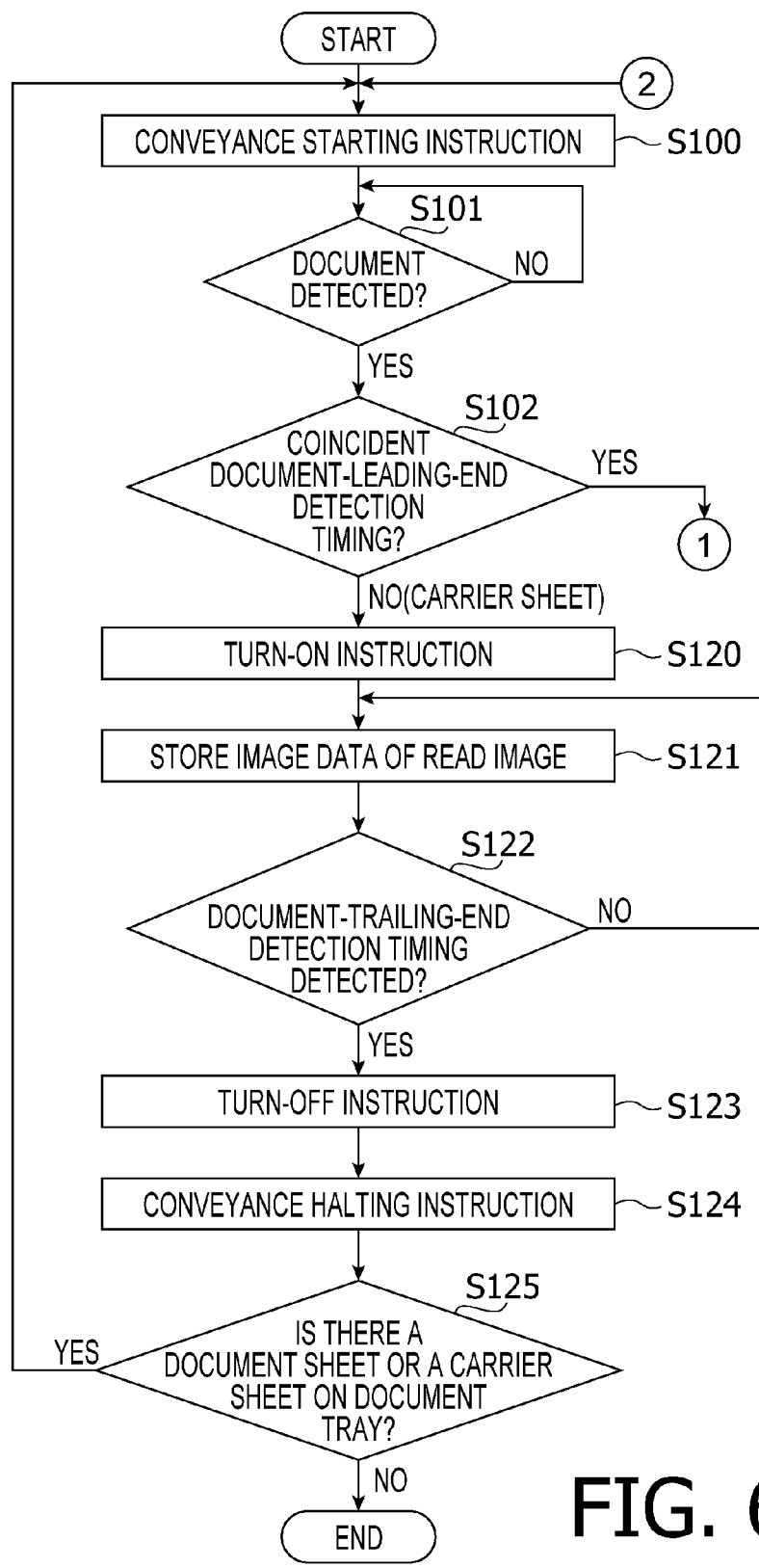
FIGS. 6A and 6B are flowcharts showing a procedure of a process to be executed by a central processing unit (hereinafter, which may be referred to as a "CPU") of the image reader in accordance with one or more aspects of the present disclosure.
Figure 6B:
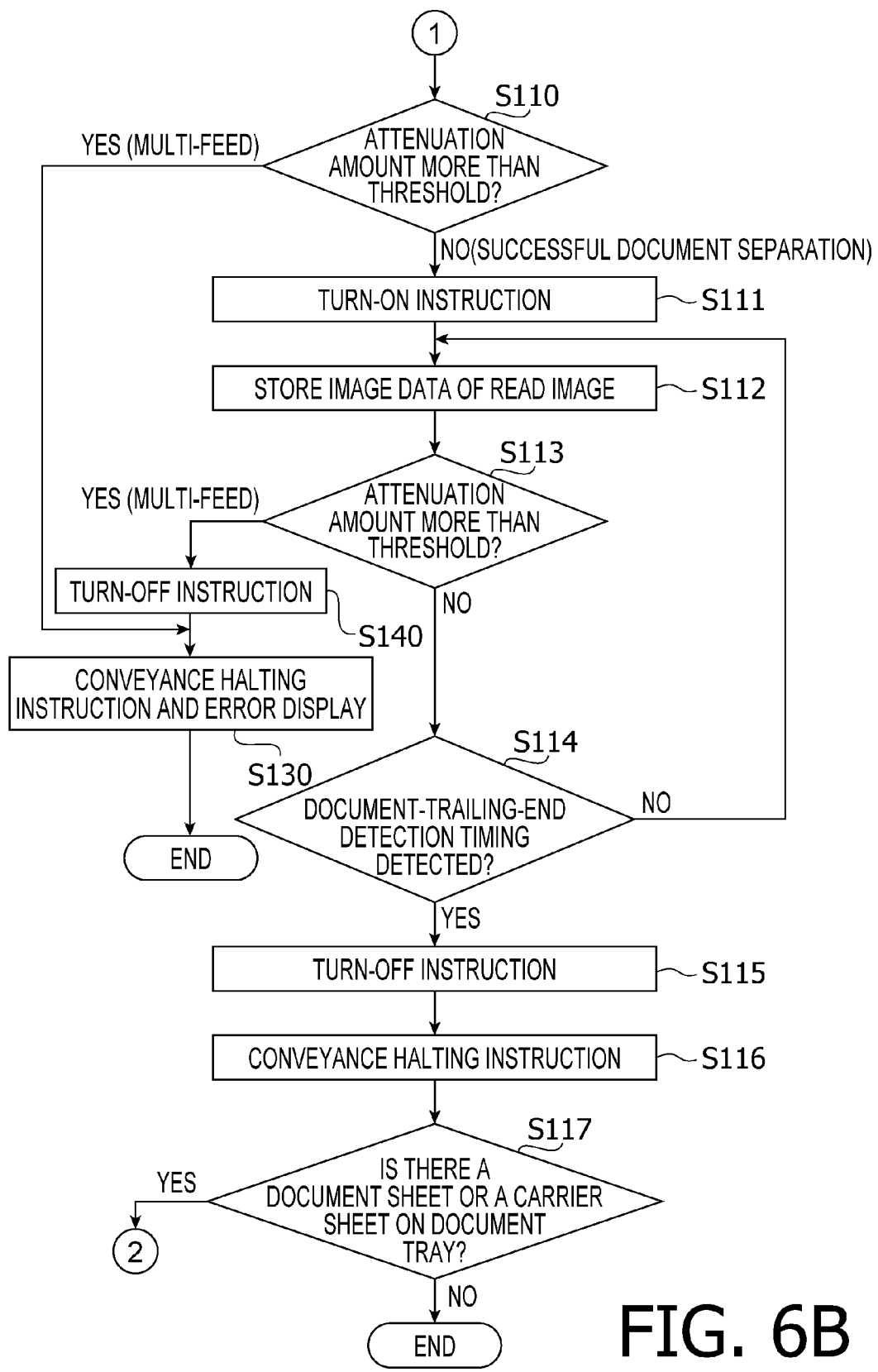

The ROM 22 is configured to store various computer programs such as programs for controlling operations of the image reader 1 and a program for executing a process shown in FIGS. 6A and 6B. The ROM 22 is an example of non-transitory storage media. Instead of the ROM 22, another one (such as a flash ROM) of the non-transitory storage media may be used. It is noted that the non-transitory storage media axe configured to store information therein, and do not include transitory media such as transmission signals. The CPU 21 is configured to control the image reader 1 in accordance with the programs, stored in the ROM 22, for controlling operations of the image reader 1. The RAM 23 is configured to temporarily store information received from elements included in the image reader 1.

Each of the switches 6 is configured to accept a user operation and transmit information corresponding to the accepted operation to the CPU 21. When receiving information from the switches 6, the image reader 1 performs the process shown in FIGS. 6A and 6B.

The LEDs 7 are configured to show states of the image reader 1. For example, the LEDs 7 may include two LEDs. One of the LEDs may be configured to be turned on in green when the image reader 1 is in a stand-by state. The other LED may be configured to be turned on in red when an error such as multi-feed occurs.

The driving unit 53 includes a motor (not shown) for driving the pickup roller 11, the feed rollers 14, and the discharge rollers 17. When the motor is driven or stopped according to an instruction from the CPU 21, the pickup roller 11, the feed rollers 14, and the discharge rollers 17 are rotated or stopped.

The reading unit 16 includes a light source 51 and a light receiver 52. The light source 51 includes LEDs of the three primary colors (RGB). The reading unit 16 turns on each of the LEDs of RGB in accordance with a turn-on instruction from the CPU 21. In addition, the reading unit 16 turns off each of the LEDs of RGB in accordance with a turn-off instruction from the CPU 21. The light receiver 52 is configured to receive light reflected by a document sheet being conveyed along the conveyance path 30 and generate an analog signal corresponding to a quantity of the received light. The light receiver 52 transmits, to the AFE 50, an analog signal corresponding to a light receiving quantity of reflected light that is originally derived from light emitted by each of the three LEDs.

The AFE 50 includes an amplifier, a filter, and an A/D convertor. The AFE 50 is connected with the reading unit 16 and the controller 20. The AFE 50 converts an analog signal received from the light receiver 52 of the reading unit 16 into a digital signal. Read data as the digital signal acquired through the A/D conversion is transmitted to the controller 20. A plurality of pieces of read data are combined by the CPU 21 and stored into the RAM 23 as image data of a single image.

When one or more document sheets traverse a position between the receiver 13A and the transmitter 13B of the multi-feed detector 13, an amplitude of an ultrasonic wave transmitted by the transmitter 13B is attenuated, and the receiver 13A receives the ultrasonic wave with the attenuated amplitude. An attenuation amount of the ultrasonic wave depends on the number of the document sheets positioned between the receiver 13A and the transmitter 13B. Specifically, the larger the number of the document sheets is, the larger the attenuation amount of the ultrasonic wave is. Meanwhile, the smaller the number of the document sheets is, the smaller the attenuation amount of the ultrasonic wave is. The multi-feed detector 13 transmits, to the CPU 21, amplitude information showing the attenuated amplitude as detected. The CPU 21 determines the attenuation amount by calculation based on the amplitude information on the attenuated amplitude that has been received from the receiver 13A and reference amplitude information acquired when there was no document sheet being conveyed. For instance, the calculation may be to obtain a difference between the amplitude information and the reference amplitude information or a ratio of the amplitude information to the reference amplitude information. Determination as to whether multi-feed has occurred is made based on whether the calculated attenuation amount is more than a threshold indicating occurrence of multi-feed. The reference amplitude information acquired when there was no document sheet being conveyed and the threshold indicating occurrence of multi-feed are previously stored in the ROM 22.

The document detector 15 is configured to detect whether there is a document sheet being conveyed. When the end portion of the rotatable element 15A rotates after contacting a document sheet being conveyed, the other end portion of the rotatable element 15A continuously contacts the document sheet and does not block the optical path of the photo-coupler 15B. Each of the document detecting sensors 15L and 15R of the document detector 15 transmits detection information to the CPU 21.

The front sensor 18 is configured to detect whether there is a document sheet placed on the document tray 3. When the end portion of the movable element of the front sensor 18 rotates after contacting a document sheet placed on the document tray 3, the other end portion of the movable element does not block the optical path of the photo-coupler of the front sensor 18. The photo-coupler detects whether the movable element blocks the optical path of the photo-coupler, and transmits detection information to the CPU 21. For instance, when detecting that the movable element does not block the optical path of the photo-coupler, the photo-coupler may transmit ON information as the detection information to the CPU 21. Meanwhile, when detecting that the movable element blocks the optical path of the photo-coupler, the photo-coupler may transmit Off information as the detection information to the CPU 21. The movable element is in contact with a document sheet until all document sheets are fed out of the document tray 3. The photo-coupler detects that the movable element does not block the optical path of the photo-coupler, and transmits the ON information as the detection information to the CPU 21.

(Control by CPU)

FIGS. 6A and 6B are flowcharts showing a procedure of a process to be executed by the CPU 21 of the image reader 1. When accepting an instruction to start image reading through the switches 6, the CPU 21 starts the process shown in the flowchart of FIGS. 6A and 6B in accordance with the program stored in the ROM 22.

In S100, the CPU 21 transmits, to the driving unit 53, a conveyance starting instruction to start a conveying operation. Thereafter, the CPU 21 goes to S101.

In S101, the CPU 21 determines whether at least one of the document detecting sensors 15L and 15R has detected a document sheet. When determining that at least one of the document detecting sensors 15L and 15R has detected a document sheet (i.e., when determining that the detection information received from at least one of the document detecting sensors 15L and 15R is ON information) (S101: Yes), the CPU 21 goes to S102. Meanwhile, when determining that the detection information received from each of the document detecting sensors 15L and 15R is OFF information) (S101: No), the CPU 21 repeats the operation of S101. In the following description, a particular point of time when the detection information is changed from the OFF information to the ON information will be referred to as the "document-leading-end detection timing." Further, a particular point of time when the detection information is changed from the ON information to the OFF information will be referred to as a "document-trailing-end detection timing."

In S102, the CPU 21 determines whether the detection information received from the document detecting sensors 15L and 15R satisfies a first state. When not satisfying the first state, the detection information received from the document detecting sensors 15L and 15R satisfies a second state. It is noted that when a document sheet is being conveyed, the detection information received from the document detecting sensors 15L and 15R satisfies the first state. Meanwhile, when a carrier sheet 40 is being conveyed, the detection information received from the document detecting sensors 15L and 15R satisfies the second state. Specifically, in S102, the CPU 21 compares a document-leading-end detection timing identified based on the detection information received from the document detecting sensor 15L with a document-leading-end detection timing identified based on the detection information received from the document detecting sensor 15R. Namely, the CPU 21 determines whether a time difference between a particular point of time when the CPU 21 has received the detection information from the document detecting sensor 15L and a particular point of time when the CPU 21 has received the detection information from the document detecting sensor 15R satisfies a predetermined relationship. When determining that the two document-leading-end detection timings are coincident with each other, the CPU 21 determines that the detection information received from the document detecting sensors 15L and 15R satisfies the first state. In this case, the CPU 21 makes an affirmative determination in S102 (S102: Yes), and executes, as a first sequence, S110 and subsequent operations. Further, in this case, the CPU 21 determines that the aforementioned time difference satisfies the predetermined relationship. Meanwhile, when determining that the two document-leading-end detection timings are different, the CPU 21 determines that the detection information received from the document detecting sensors 15L and 15R does not satisfy the first state (but satisfies the second state). In this case, the CPU 21 makes a negative determination in S102 (S102: No), and executes S120 as a second sequence. Further, in this case, the CPU 21 determines that the aforementioned time difference does not satisfy the predetermined relationship.

In S110, the CPU 21 determines whether the attenuation amount based on the amplitude information received from the multi-feed detector 13 is more than the threshold indicating occurrence of multi-feed that is previously stored in the ROM 22. When determining that the attenuation amount based on the amplitude information received from the multi-feed detector 13 is more than the threshold indicating occurrence of multi-feed (S110: Yes), the CPU 21 goes to S130. Meanwhile, when determining that the attenuation amount based on the amplitude information received from the multi-feed detector 13 is not more than the threshold indicating occurrence of multi-feed (S110: No), the CPU 21 goes to S111.

In S111, the CPU 21 transmits to the reading unit 16 a turn-on instruction to turn on the light source 51. To read the document sheet in color, the CPU 21 transmits to the reading unit 16 a turn-on instruction to turn on the LEDs of the three primary colors RGB in a time division manner. To read the document sheet in monochrome, the CPU 21 transmits to the reading unit 16 a turn-on instruction to turn on one or all of the LEDs of RGB. After S111, the CPU 21 goes to S112.

In S112, the CPU 21 combines a plurality of pieces of read data. Specifically, the light receiver 52 receives light reflected by a part of the document sheet being conveyed along the conveyance path 30, and transmits to the AFE 50 an analog signal corresponding to a quantity of the received light. The AFE 50 converts the received analog signal into a digital signal. The digital signal acquired through the A/D conversion by the AFE 50 is a piece of partial read data of the document sheet. Therefore, the CPU 21 combines a plurality of pieces of partial read data, and stores into the RAM 23 the combined read data as image data of a single whole image.

In S113, in die same manner as S110, the CPU 21 determines whether the attenuation amount based on the amplitude information received from the multi-feed detector 13 is more than the threshold indicating occurrence of multi-feed that is previously stored in the ROM 22. When determining that the attenuation amount based on the amplitude information received from the multi-feed detector 13 is more than the threshold indicating occurrence of multi-feed (S113: Yes), the CPU 21 goes to S140. Meanwhile, when determining that the attenuation amount based on the amplitude information received from the multi-feed detector 13 is not more than the threshold indicating occurrence of multi-feed (S113: No), the CPU 21 goes to S114.

In S114, the CPU 21 determines whether the document detecting sensors 15L and 15R have detected a document-trailing-end detection timing, based on the detection information received from the document detecting sensors 15L and 15R. When determining that the document detecting sensors 15L and 15R have detected a document-trailing-end detection timing (S114: Yes), the CPU 21 goes to S115. Meanwhile, when determining that the document detecting sensors 15L and 15R have not detected a document-trailing-end detection timing (S114: No), the CPU 21 goes to S112. Namely, as long as the CPU 21 determines in S113 that the attenuation amount based on the amplitude information received from the multi-feed detector 13 is not more than the threshold indicating occurrence of multi-feed (S113: No), the CPU 21 continues a conveying operation of conveying the document sheet and a reading operation of reading the document sheet via execution of S112 and the negative determination in S114 (S114: No).

In S115, the CPU 21 transmits to the reading unit 16 a turn-off instruction to turn off the light source 51. Thereafter, the CPU 21 goes to S116.

In S116, the CPU 21 transmits to the driving unit 53 a conveyance halting instruction to halt the conveying operation. Thereafter, the CPU 21 goes to S117.

In S117, the CPU 21 determines whether there is a document sheet or a carrier sheet 40 placed on the document tray 3, based on detection information received from the front sensor 18. When determining that there is a document sheet or a carrier sheet 40 placed on the document tray 3 (S117: Yes), the CPU 21 goes to S100. Meanwhile, when determining that there is not a document sheet or a carrier sheet 40 placed on the document tray 3 (S117: No), the CPU 21 terminates the process shown in FIGS. 6A and 6B.

In S120, the CPU 21 transmits to the reading unit 16 a turn-on instruction to turn on the light source 51. To read the document sheet in color, the CPU 21 transmits to the reading unit 16 a turn-on instruction to turn on the LEDs of the three primary colors RGB in a time division manner. To read the document sheet in monochrome, the CPU 21 transmits to the reading unit 16 a turn-on instruction to turn on one or all of the LEDs of RGB. After S120, the CPU 21 goes to S121.

In S121, the CPU 21 combines a plurality of pieces of read data. Specifically, the light receiver 52 receives light reflected by a part of the document sheet being conveyed along the conveyance path 30, and transmits to the AFE 50 an analog signal corresponding to a quantity of the received light. The AFE 50 converts the received analog signal into a digital signal. The digital signal acquired through the A/D conversion by the AFE 50 is a piece of partial read data of the document sheet. Therefore, the CPU 21 combines a plurality of pieces of partial read data, and stores into the RAM 23 the combined read data as image data of a single whole image.

In S122, in the same manner as S114, the CPU 21 determines whether the document detecting sensors 15L and 15R have detected a document-trailing-end detection timing, based on the detection information received from the document detecting sensors 15L and 15R. When determining that the document detecting sensors 15L and 15R have detected a document-trailing-end detection timing (S122: Yes), the CPU 21 goes to S123. Meanwhile, when determining that the document detecting sensors 15L and 15R have not detected a document-trailing-end detection timing (S122: No), the CPU 21 goes to S121. Namely, when determining in S102 that the two document-leading-end detection timings are different (S102: No), the CPU 21 continues the conveying operation and the reading operation via execution of S121 and the negative determination in S122 (S122: No), regardless of the amplitude information received from the multi-feed detector 13.

In S123, the CPU 21 transmits to the reading unit 16 a turn-off instruction to turn off the light source 51. Thereafter, the CPU 21 goes to S124.

In S124, the CPU 21 transmits to the driving unit 53 a conveyance halting instruction to halt the conveying operation. Thereafter, the CPU 21 goes to S125.

In S125, in the same manner as S117, the CPU 21 determines whether there is a document sheet or a carrier sheet 40 placed on the document tray 3, based on detection information received from the front sensor 18. When determining that there is a document sheet or a carrier sheet 40 placed on the document tray 3 (S125: Yes), the CPU 21 goes to S100. Meanwhile, when determining that there is not a document sheet or a carrier sheet 40 placed on the tray 3 (S125: No), the CPU 21 terminates the process shown in FIGS. 6A and 6B.

In S130, the CPU 21 transmits to the driving unit 53 a conveyance halting instruction to halt the conveying operation. Further, the CPU 21 turns on an LED, which is for showing an error, of the LEDs 7 in red. Thereafter, the CPU 21 terminates the process shown in FIGS. 6A and 6B.

In S140, the CPU 21 transmits to the reading unit a turn-off instruction to turn off the light source 51. Thereafter, the CPU 21 goes to S130.

Specific Operational Examples

In the image reader 1 of the illustrative embodiment, the CPU 21 executes below-mentioned first to fourth operational examples by automatically switching operations in accordance with detection information and detection timings received from the document detecting sensors 15L and 15R and detection information received from the multi-feed detector 13, without a mode switching operation by a user.

First Operational Example

Control of Document Reading when Multi-Feed is not Occurring

Figure 7:
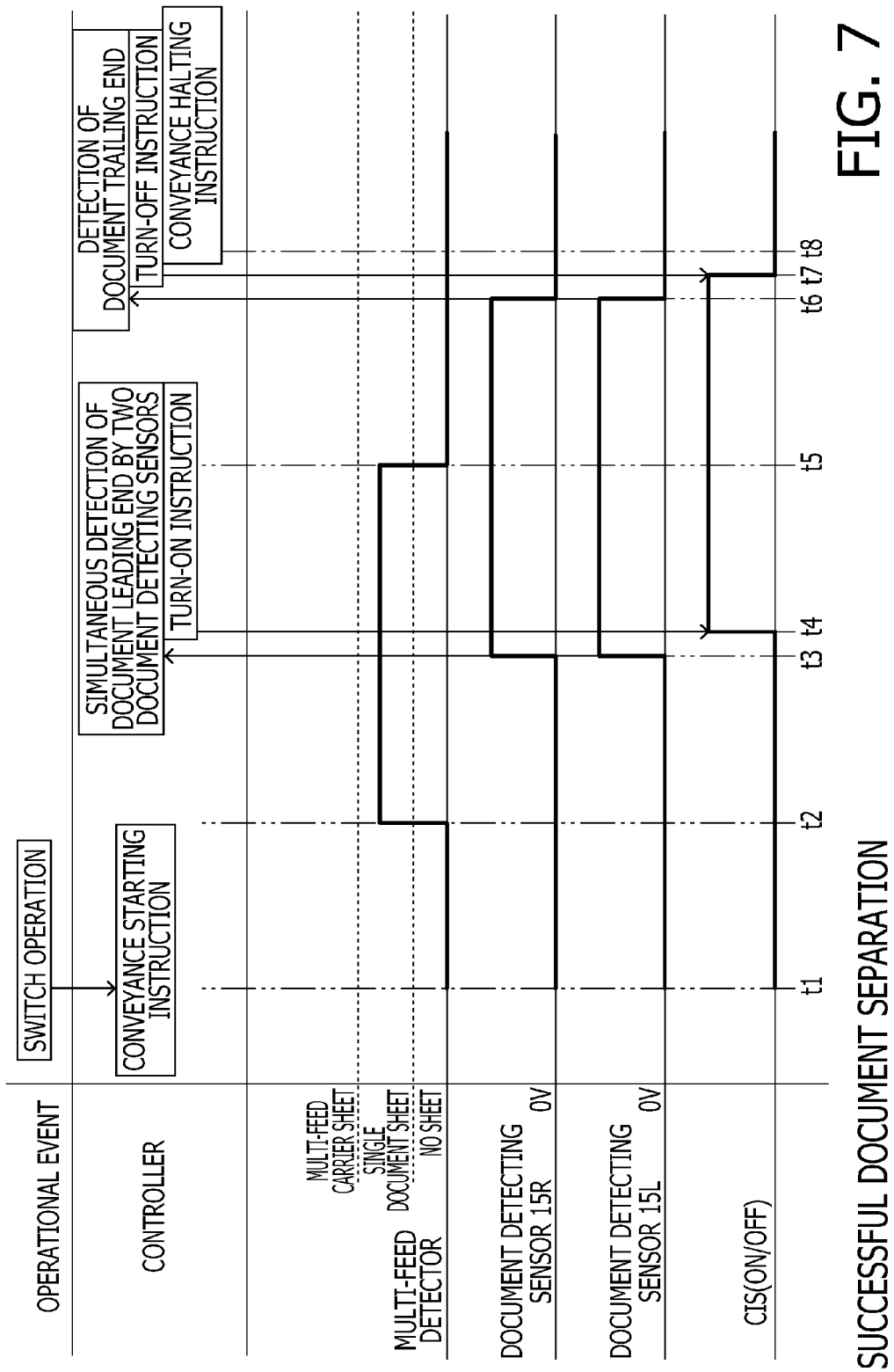
FIG. 7 is a timing chart showing variations of output values from the document detector (the document detecting sensors) and a multi-feed detector when document sheets are successfully separated and conveyed, in accordance with one or more aspects of the present disclosure.

Referring to FIGS. 6A-6B and 7, an explanation will be provided about control of a reading operation of reading document sheets being conveyed without overlapping each other. In FIG. 7, each of "t1" to "t8" represents a particular point of time when a corresponding operation is executed or a corresponding event occurs. Each of "t1" to "t8" will be referred to as an "operation executing timing" or an "event occurrence timing."

The process shown in FIGS. 6A and 6B is launched in accordance with information input through an operation of the switches 6. At an operation executing timing t1, the CPU 21 transmits a conveyance starting instruction to the driving unit 53 (S100). In response to receipt of the conveyance starting instruction, the driving unit 53 rotates the pickup roller 11, the feed rollers 14, and the discharge rollers 17. Thereby, document sheets placed on the document tray 3 are conveyed downstream in the conveyance direction.

The document sheets are separated on a sheet-by-sheet basis by the document separator 12. At an event occurrence timing t2, a document sheet, which has passed through the document separator 12, traverses the receiver 13A and the transmitter 13B of the multi-feed detector 13. The event occurrence timing t2 is a particular point of time when the amplitude information output from the multi-feed detector 13 changes during a time period from the operation executing timing t1 to a below-mentioned event occurrence timing t3. Nevertheless, the CPU 21 continues the conveying operation without determining whether the attenuation amount based on the amplitude information is more than the threshold indicating occurrence of multi-feed until the event occurrence timing t3. It is noted that to "continue the conveying operation" means that the CPU 21 does not transmit a conveyance halting instruction to the driving unit 53 or that the CPU 21 transmits a conveyance continuing instruction to the driving unit 53. Anyway, at the event occurrence timing t2, the document conveyance has only to be continued.

Subsequently, at the event occurrence timing t3, the document detector 15 detects the document sheet (S101: Yes). The CPU 21 compares the document-leading-end detection timing of the document detecting sensor 15L with the document-leading-end detection timing of the document detecting sensor 15R (S102). In the first operational example, what is conveyed is a regular document sheet that is not held in the carrier sheet 40. Therefore, the CPU 21 determines that the document-leading-end detection timing of the document detecting sensor 15L is coincident with the document-leading-end detection timing of the document detecting sensor 15R (S102: Yes). Thereafter, in response to the affirmative determination in S102, the CPU 21 goes to S110.

In S110, the CPU 21 determines whether the attenuation amount based on the amplitude information received from the multi-feed detector 13 is more than the predetermined threshold. In the first operational example, multi-feed is not occurring. Therefore, the CPU 21 determines that the attenuation amount based on the amplitude information received from the multi-feed detector 13 is not more than the predetermined threshold (S110: No). Thereafter, the CPU 21 goes to S111.

At an operation executing timing t4, the CPU 21 transmits to the reading unit 16 a turn-on instruction to turn on the light source 51 (S111). In response to receipt of the turn-on instruction, the reading unit 16 turns on the light source 51. To read the document sheet in color, the reading unit 16 turns on the LEDs of the three primary colors RGB in a time division manner. To read the document sheet in monochrome, the reading unit 16 turns on one or all of the LEDs of the three primary colors RGB.

The CPU executes S112, S113, and S114 during a time period from the operation executing timing t4 to an event occurrence timing t6. The light receiver 52 receives light reflected by the document sheet, and transmits to the AFE 50 an analog signal corresponding to a quantity of the received light. The AFE 50 performs A/D conversion of the received analog signal, and transmits a digital signal acquired through the A/D conversion to the CPU 21. Further, the CPU 21 combines a plurality of pieces of read data, and stores into the RAM 23 the combined data as image data of a single image (S112).

An event occurrence timing t5 is a particular point of time when the amplitude information from the multi-feed detector 13 is determined to have changed. At the event occurrence timing t5, the CPU 21 determines whether the attenuation amount based on the amplitude information received from the multi-feed detector 13 is more than the threshold indicating occurrence of multi-feed that is previously stored in the ROM 22 (S113). In the first operational example, multi-feed is not occurring. Therefore, the CPU 21 determines that the attenuation amount based on the amplitude information received from the multi-feed detector 13 is not more than the predetermined threshold (S113: No). Thereafter, the CPU 21 goes to S114.

Next, the CPU 21 determines whether the document detecting sensors 15L and 15R have detected a document-trailing-end detection timing, based on the detection information received from the document detecting sensors 15L and 15R (S114). At the event occurrence timing t6, when determining that the document detecting sensors 15L and 15R have detected a document-trailing-end detection timing (S114: Yes), the CPU 21 goes to S115. Meanwhile, when determining that the document detecting sensors 15L and 15R have not detected a document-trailing-end detection timing (S114: No), the CPU 21 goes to S112.

In S115, at an operation executing timing t7, the CPU 21 transmits to the reading unit 16 a turn-off instruction to turn off the light source 51. In response to receipt of the turn-off instruction, the reading unit 16 turns off the light source 51.

In S116, at an operation executing timing t8, the CPU 21 transmits a conveyance halting instruction to the driving unit 53. In accordance with the conveyance halting instruction, the driving unit 53 halts the rotations of the pickup roller 11, the feed rollers 14, and the discharge rollers 17.

In S117, the CPU 21 determines whether there is a document sheet or a carrier sheet 40 placed on the document tray 3, based on the detection information received from the front sensor 18. When determining that there is a document sheet or a carrier sheet 40 placed on the document tray 3 (S117: Yes), the CPU 21 goes to S100. Meanwhile, when determining that there is not a document sheet or a carrier sheet 40 placed on the document tray 3 (S117: No), the CPU 21 terminates the process shown in FIGS. 6A and 6B.

Second Operational Example

Control of Document Reading Using a Carrier Sheet

Figure 8:
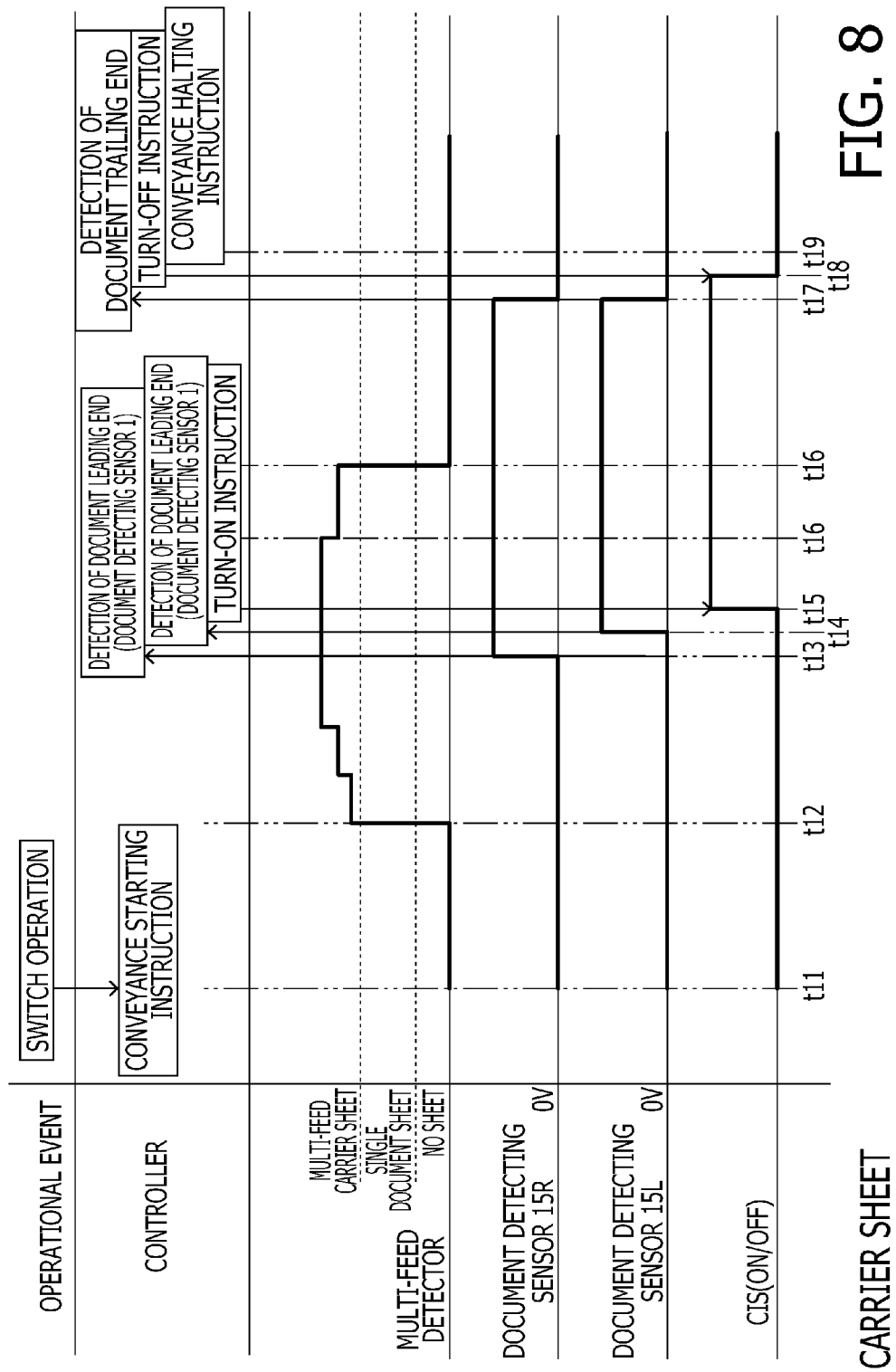
FIG. 8 is a timing chart showing variations of output values from the document detector (the document detecting sensors) and the multi-feed detector when a carrier sheet is conveyed, in accordance with one or more aspects of the present disclosure.

Referring FIGS. 6A-6B and 8, an explanation will be provided about control of document reading using the carrier sheet 40. In FIG. 8, each of "t11" to "t19" represents a particular point of time when a corresponding operation is executed or a corresponding event occurs. Each of "t11" to "t19" will be referred to as an "operation executing timing" or an "event occurrence timing."

The process shown in FIGS. 6A and 6B is launched in accordance with the information input through the operation of the switches 6. At an operation executing timing t11, the CPU 21 transmits a conveyance starting instruction to the driving unit 53 (S100). In response to receipt of the conveyance starting instruction, the driving unit 53 rotates the pickup roller 11, the feed rollers 14, and the discharge rollers 17. Thereby, document sheets placed on the document tray 3 are conveyed downstream in the conveyance direction.

At an event occurrence timing t12, (a document sheet between the transparent sheets of) the carrier sheet 40, which has passed through the document separator 12, traverses the receiver 13A and the transmitter 13B of the multi-feed detector 13. The event occurrence timing t12 is a particular point of time when the amplitude information output from the multi-feed detector 13 changes during a time period from the operation executing timing t11 to a below-mentioned event occurrence timing t13. Nevertheless, the CPU 21 continues the conveying operation without determining whether the attenuation amount based on the amplitude information is more than the threshold indicating occurrence of multi-feed until the event occurrence timing t13. It is noted that to "continue the conveying operation" means that the CPU 21 does not transmit a conveyance halting instruction to the driving unit 53 or that the CPU 21 transmits a conveyance continuing instruction to the driving unit 53. Anyway, at the event occurrence timing t12, the document conveyance has only to be continued. After passing through the multi-feed detector 13, the document sheet (between the transparent sheets of the carrier sheet 40) is further conveyed downstream in the conveyance direction by the feed rollers 14.

Subsequently, at the event occurrence timing t13 (S101: Yes) and an event occurrence timing 114, the document detecting sensors 15R and 15L detect the document sheet, respectively. The CPU 21 determines whether the document-leading-end detection timing of the document detecting sensor 15L is coincident with the document-leading-end detection timing of the document detecting sensor 15R (S102). In the second operational example, the document sheet is held in the carrier sheet 40. Further, the cutout 41 is formed at the leading end portion 40A that is a bonded portion of the transparent sheets of the carrier sheet 40. Therefore, the CPU 21 determines that the document-leading-end detection timing of the document detecting sensor 15L is different from the document-leading-end detection timing of the document detecting sensor 15R, by a time delay caused due to the cutout 41 (S102: No). Thereafter, the CPU 21 goes to S120.

At an operation executing timing t15, the CPU 21 transmits to the reading unit 16 a turn-on instruction to turn on the light source 51 (S120). In response to receipt of the turn-on instruction, the reading unit 16 turns on the light source 51. To read the document sheet in color, the reading unit 16 turns on the LEDs of the three primary colors RGB in a time division manner. To read the document sheet in monochrome, the reading unit 16 turns on one or all of the LEDs of the three primary colors RGB.

The CPU executes S121 and S122 during a time period from the operation executing timing t15 to an event occurrence timing t17. The light receiver 52 receives light reflected by the document sheet, and transmits to the AFE 50 an analog signal corresponding to a quantity of the received light. The AFE 50 performs A/D conversion of the received analog signal, and transmits a digital signal acquired through the A/D conversion to the CPU 21. Further, the CPU 21 combines a plurality of pieces of read data, and stores into the RAM 23 the combined data as image data of a single image (S112).

In the second operational example, each event occurrence timing t16 is an example of a point of time when the amplitude information changes. Nevertheless, the CPU 21 continues the conveying operation without determining whether the attenuation amount based on the amplitude information is more than the threshold indicating occurrence of multi-feed. It is noted that to "continue the conveying operation" means that the CPU 21 does not transmit a conveyance halting instruction to the driving unit 53 or that the CPU 21 transmits a conveyance continuing instruction to the driving unit 53. Anyway, at the event occurrence timing t16, the document conveyance has only to be continued. After passing through the multi-feed detector 13, the document sheet (held in the carrier sheet 40) is further conveyed downstream in the conveyance direction by the feed rollers 14.

In S122, the CPU 21 determines whether the document detecting sensors 15L and 15R have detected a document-trailing-end detection timing, based on the detection information received from the document detecting sensors 15L and 15R. When determining that the document detecting sensors 15L, and 15R have detected a document-trailing-end detection timing (S122: Yes), the CPU 21 goes to S123. Meanwhile, when determining that the document detecting sensors 15L and 15R have not detected a document-trailing-end detection timing (S122: No), the CPU 21 goes to S121.

In S123, at an operation executing timing 118, the CPU 21 transmits to the reading unit 16 an turn-off instruction to turn off the light source 51. In response to receipt of the turn-off instruction, the reading unit 16 turns off the light source 51.

In S124, at an operation executing timing t19, the CPU 21 transmits a conveyance halting instruction to the driving unit 53. In accordance with the conveyance halting instruction, the driving unit 53 halts the rotations of the pickup roller 11, the feed rollers 14, and the discharge rollers 17.

In S125, the CPU 21 determines whether there is a document sheet or a carrier sheet 40 placed on the document tray 3, based on the detection information received from the front sensor 18. When determining that there is a document sheet or a carrier sheet 40 placed on the document tray 3 (S125: Yes), the CPU 21 goes to S100. Meanwhile, when determining that there is not a document sheet or a carrier sheet 40 placed on the document tray 3 (S125: No), the CPU 21 terminates the process shown in FIGS. 6A and 6B.

Third Operational Example

Control 1 of Document Reading when Multi-Feed is Occurring

Figure 9:
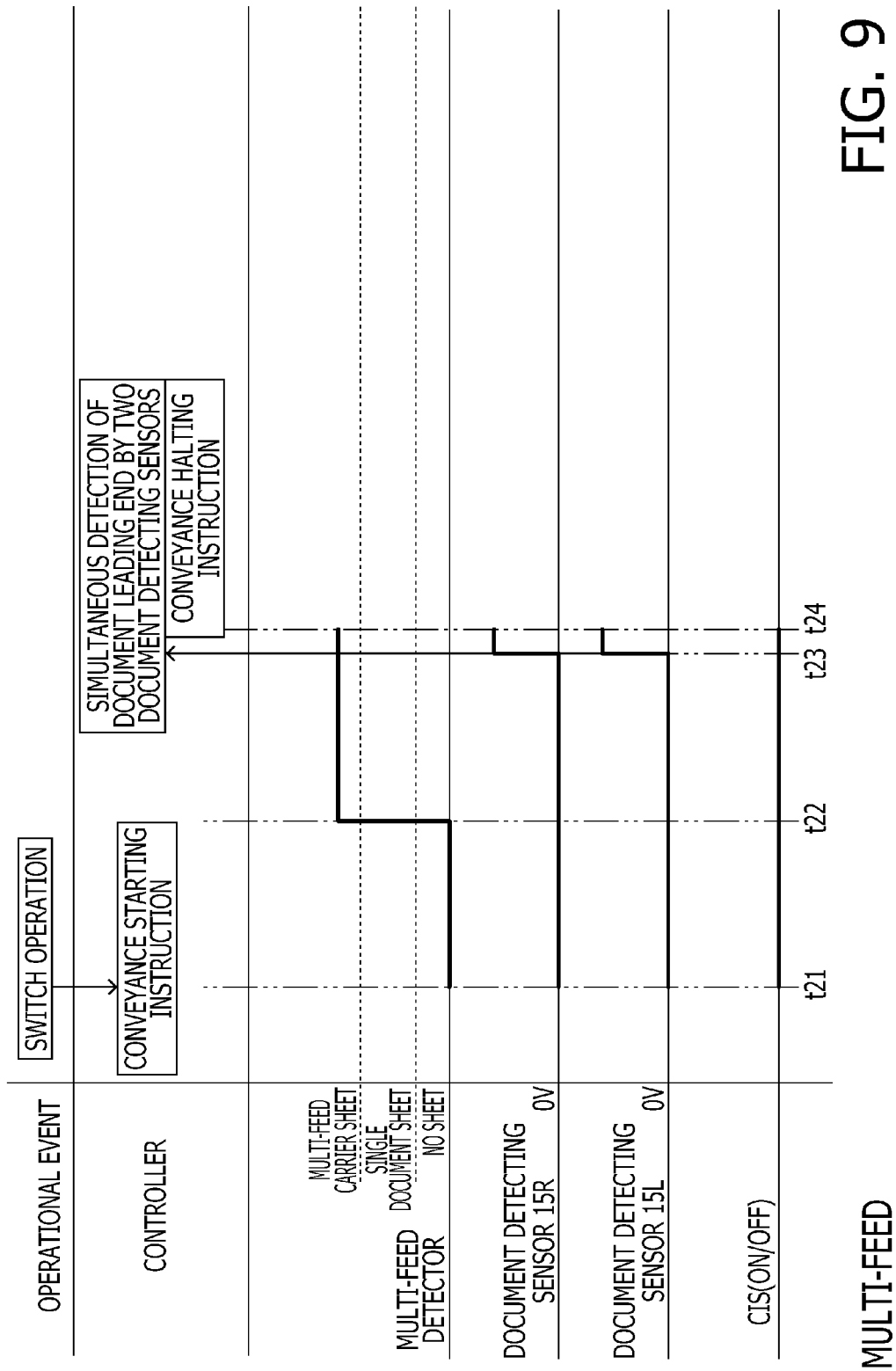
FIG. 9 is a timing chart showing variations of output values from the document detector (the document detecting sensors) and the multi-feed detector when multi-feed occurs, in accordance with one or more aspects of the present disclosure.

Referring FIGS. 6A-6B and 9, an explanation will be provided about control of document reading when multi-feed is occurring. In FIG. 9, each of "t21" to "t24" represents a particular point of time when a corresponding operation is executed or a corresponding event occurs. Each of "t21" to "t24" will be referred to as an "operation executing timing" or an "event occurrence timing."

The process shown in FIGS. 6A and 6B is launched in accordance with the information input through the operation of the switches 6. At an operation executing timing t21, the CPU 21 transmits a conveyance starting instruction to the driving unit 53 (S100). In response to receipt of the conveyance starting instruction, the driving unit 53 rotates the pickup roller 11, the feed rollers 14, and the discharge rollers 17. Thereby, document sheets placed on the document tray 3 are conveyed downstream in the conveyance direction.

At an event occurrence timing t22, a document sheet, which has passed through the document separator 12, traverses the receiver 13A and the transmitter 13B of the multi-feed detector 13. The event occurrence timing t22 is a particular point of time when the amplitude information output from the multi-feed detector 13 changes during a time period from the operation executing timing t21 to an event occurrence timing t23. Nevertheless, the CPU 21 continues the conveying operation without determining whether the attenuation amount based on the amplitude information is more than the threshold indicating occurrence of multi-feed until the event occurrence timing t23. It is noted that to "continue the conveying operation" means that the CPU 21 does not transmit a conveyance halting instruction to the driving unit 53 or that the CPU 21 transmits a conveyance continuing instruction to the driving unit 53. Anyway, at the event occurrence timing t22, the document conveyance has only to be continued. After passing through the multi-feed detector 13, the document sheet is further conveyed downstream in the conveyance direction by the feed rollers 14.

Subsequently, at the event occurrence timing t23, the document detector 15 detects the document sheet (S101: Yes). The CPU 21 determines whether the document-leading-end detection timing of the document detecting sensor 15L is coincident with the document-leading-end detection timing of the document detecting sensor 15R (S102). In the third operational example, what is conveyed is a regular document sheet that is not held in the carrier sheet 40. Therefore, the CPU 21 determines that the document-leading-end detection timing of the document detecting sensor 15L is coincident with the document-leading-end detection timing of the document detecting sensor 15R, by a time delay corresponding to the cutout 41 (S102: Yes). Thereafter, the CPU 21 goes to S110.

In S110, the CPU 21 determines whether the attenuation amount based on the amplitude information received from the multi-feed detector 13 is more than the predetermined threshold indicating occurrence of multi-feed. In the third operational example, multi-feed is occurring. Therefore, the CPU 21 determines that the attenuation amount based on the amplitude information received from the multi-feed detector 13 is more than the predetermined threshold indicating occurrence of multi-feed (S110: Yes). Thereafter, in response to the affirmative determination in S110, the CPU 21 goes to S130.

In S130, at an operation executing timing t24, the CPU 21 transmits a conveyance halting instruction to the driving unit 53. In accordance with the conveyance halting instruction, the driving unit 53 halts the rotations of the pickup roller 11, the feed rollers 14, and the discharge rollers 17. Further, the CPU 21 turns on the TED, for showing an error, of the LEDs 7 in red. Thereafter, the CPU 21 terminates the process shown in FIGS. 6A and 6B.

Fourth Operational Example

Control 2 of Document Reading when Multi-Feed is Occurring

Figure 10:
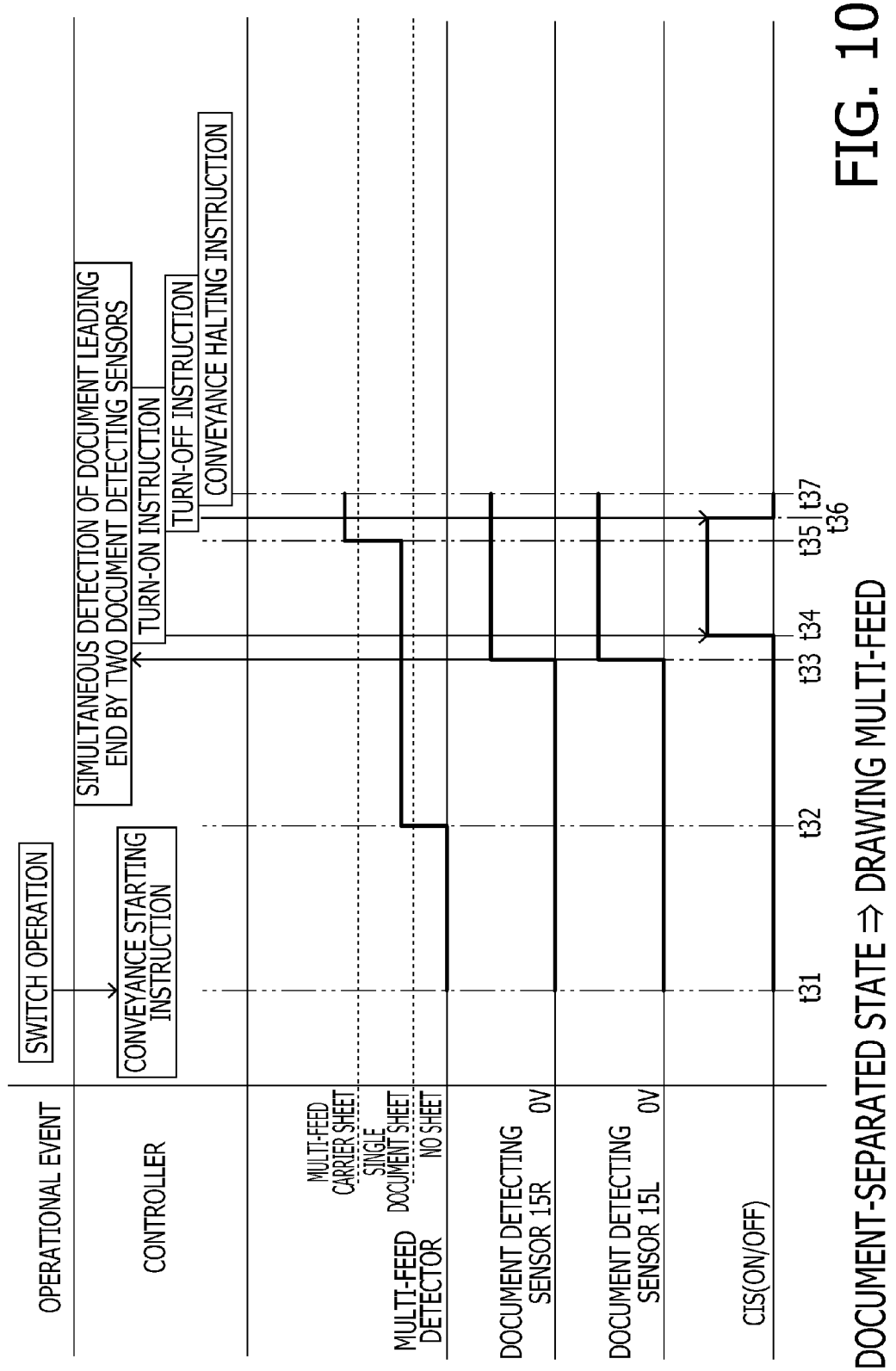
FIG. 10 is a timing chart showing variations of output values from the document detector (the document detecting sensors) and the multi-feed detector when drawing multi-feed occurs, in accordance with one or more aspects of the present disclosure.

Referring FIGS. 6A-6B and 10, an explanation will be provided about control of document reading when drawing multi-feed occurs in the middle of document conveyance. It is noted that "drawing multi-feed" means a situation where a plurality of document sheets, which have been once separated, are conveyed in an overlapping manner with a document sheet being drawn by another preceding document sheet. In FIG. 10, each of "t31" to "t37" represents a particular point of time when a corresponding operation is executed or a corresponding event occurs. Each of "t31" to "t37" will be referred to as an "operation executing timing" or an "event occurrence timing."

The process shown in FIGS. 6A and 6B is launched in accordance with the information input through the operation of the switches 6. At an operation executing timing t31, the CPU 21 transmits a conveyance starting instruction to the driving unit 53 (S100). In response to receipt of the conveyance starting instruction, the driving unit 53 rotates the pickup roller 11, the feed rollers 14, and the discharge rollers 17. Thereby, document sheets placed on the document tray 3 are conveyed downstream in the conveyance direction.

At an event occurrence timing t32, a document sheet, which has passed through the document separator 12, traverses the receiver 13A and the transmitter 13B of the multi-feed detector 13. The event occurrence timing t32 is a particular point of time when the amplitude information output from the multi-feed detector 13 changes during a time period from the operation executing timing t31 to an event occurrence timing t33. Nevertheless, the CPU 21 continues the conveying operation without determining whether the attenuation amount based on the amplitude information is more than the threshold indicating occurrence of multi-feed until the event occurrence timing t33. It is noted that to "continue the conveying operation" means that the CPU 21 does not transmit a conveyance halting instruction to the driving unit 53 or that the CPU 21 transmits a conveyance continuing instruction to the driving unit 53. Anyway, at the event occurrence timing t32, the document conveyance has only to be continued. After passing through the multi-feed detector 13, the document sheet is further conveyed downstream in the conveyance direction by the feed rollers 14.

Subsequently, at the event occurrence timing t33, the document detector 15 detects the document sheet (S101: Yes). The CPU 21 determines whether the document-leading-end detection timing of the document detecting sensor 15L is coincident with the document-leading-end detection timing of the document detecting sensor 15R (S102). In the fourth operational example, what is conveyed is a regular document sheet that is not held in the carrier sheet 40. Therefore, the CPU 21 determines that the document-leading-end detection timing of the document detecting sensor 15L is coincident with the document-leading-end detection timing of the document detecting sensor 15R, by a time delay corresponding to the cutout 41 (S102: Yes). Thereafter, the CPU 21 goes to S110.

In S110, the CPU 21 determines whether the attenuation amount based on the amplitude information received from the multi-feed detector 13 is more than the predetermined threshold indicating occurrence of multi-feed. In the fourth operational example, multi-feed is not occurring at this point of time immediately after the event occurrence timing t33. Therefore, the CPU 21 determines that the attenuation amount based on the amplitude information received from the multi-feed detector 13 is not more than the predetermined threshold indicating occurrence of multi-feed (S110: No). Thereafter, in response to the negative determination in S110, the CPU 21 goes to S111.

At an operation executing timing t34, the CPU 21 transmits to the reading unit 16 a turn-on instruction to turn on the light source 51 (S111). In response to receipt of the turn-on instruction, the reading unit 16 turns on the light source 51. To read the document sheet in color, the reading unit 16 turns on the LEDs of the three primary colors RGB in a time division manner. To read the document sheet in monochrome, the reading unit 16 turns on one or all of the LEDs of the three primary colors RGB.

The CPU executes S112, S113, and S114 during a time period from the operation executing timing t34 to an event occurrence timing t36. The light receiver 52 receives light reflected by the document sheet, and transmits to the AFE 50 an analog signal corresponding to a quantity of the received light. The AFE 50 performs A/D conversion of the received analog signal, and transmits a digital signal acquired through the A/D conversion to the CPU 21. Further, the CPU 21 combines a plurality of pieces of read data, and stores into the RAM 23 the combined data as image data of a single image (S112).

An event occurrence timing t35 is a particular point of time when the amplitude information output from the multi-feed detector 13 changes. At the event occurrence timing t35, the CPU 21 determines whether the attenuation amount based on the amplitude information received from the multi-feed detector 13 is more than the threshold indicating occurrence of multi-feed that is previously stored in the ROM 22 (S113). In the fourth operational example, drawing multi-feed occurs at this point of time. Therefore, the CPU 21 determines that the attenuation amount based on the amplitude information received from the multi-feed detector 13 is more than the threshold indicating occurrence of multi-feed (S113: Yes). Thereafter, in response to the affirmative determination in S113, the CPU 21 goes to S140.

As exemplified in the fourth operational example, there may be a case where it is determined that multi-feed has occurred in the middle of document conveyance. In such a case, the multi-feed is caused when a document sheet to be subsequently read is drawn to the document sheet being currently conveyed, by a frictional force or an electrostatic force. The document detecting sensors 15L and 15R are configured to detect existence of a conveyed object and continue to detect the conveyed object until conveyance of the conveyed object is completed. Further, the conveyed object has already been identified as a document sheet. Therefore, there is no need to determine that the conveyed object is a document sheet, based on a plurality of pieces of detection information output from the document detecting sensors 15L and 15R sensors. Thus, in S113, it is determined whether multi-feed is occurring, based only on the detection information output from the multi-feed detector 13, without relying on the detection information output from the document detector 15.

In S140, at an operation executing timing t36, the CPU 21 transmits to the reading unit 16 a turn-off instruction to turn off the light source 51. In response to receipt of the turn-off instruction, the reading unit 16 turns off the light source 51. Thereafter, the CPU 21 goes to S130. In S140, when the turn-off instruction is issued, the document reading is stopped. Nevertheless, data read before the document reading is stopped may be or may not be deleted.

In S130, at an operation executing timing t37, the CPU 21 transmits to the driving unit 53 a conveyance halting instruction to halt the conveying operation. In accordance with the conveyance halting instruction, the driving unit 53 halts the rotations of the pickup roller 11, the feed rollers 14, and the discharge rollers 17. Further, the CPU 21 turns on an LED, for showing an error, of the LEDs 7 in red. Thereafter, the CPU 21 terminates the process shown in FIGS. 6A and 6B.

As described above, according to the image reader 1, it is determined whether there is a conveyed object, based on the detection information output from the document detecting sensors 15L and 15R of the document detector 15. When determining that the detection information output from the document detecting sensors 15L and 15R satisfies the first state, the controller 20 (the CPU 21) determines whether a plurality of conveyed objects are being conveyed in a mutually-overlapping manner (i.e., whether multi-feed is occurring), based on the detection information output from the multi-feed detector 13. When determining that a plurality of conveyed objects are being conveyed in a mutually-overlapping manner, the controller 20 halts at least one of a conveying operation and a reading operation. Meanwhile, when determining that the detection information output from the document detecting sensors 15L and 15R satisfies the second state, the controller 20 (the CPU 21) continues the conveying operation and the reading operation regardless of the detection information output from the multi-feed detector 13. Namely, the controller 20 automatically switches between continuing and halting of the conveying operation and the reading operation, based on the detection information output from the document detecting sensors 15L and 15R and the detection information output from the multi-feed detector 13. Thereby, it is possible to cause the image reader 1 to read a document sheet held in the carrier sheet 40 having the cutout 41, with no need for user's troublesome operations for switching the operational mode.

Further, at least two of the document detecting sensors 15L and 15R may be disposed in the conveyance area defined when the two side guides 10 are positioned closest to each other. Thereby, even in a conveying operation and a reading operation for a document sheet that has a width corresponding to the conveyance area defined when the two side guides 10 are positioned closest to each other, each of the document detecting sensors 15L and 15R is allowed to accurately detect existence of the document sheet. Accordingly, it is possible to more certainly perform a conveying operation and a reading operation for a document sheet and for a document sheet held in the carrier sheet 40 having the cutout 41.

When a plurality of document sheets are stacked on the document tray 3, an electrostatic force and a frictional force are applied between a first document sheet to be conveyed by a document conveyor (e.g., the pickup roller 11, the feed rollers 14, and the discharge rollers 17) and a second document sheet to be subsequently conveyed thereby. Therefore, when the two document sheets are consecutively read, the second document sheet might be drawn to the first document sheet. In this case, after the controller 20 once determines that multi-feed is not occurring and continues the reading operation, the detection information output from the multi-feed detector 13 shows occurrence of multi-feed. Nevertheless, each of the document detecting sensors 15L and 15R is configured to detect existence of a conveyed object, and continue to detect the conveyed object until conveyance of the conveyed object is completed. Accordingly, when the controller 20 continues a control process, the controller 20 is not allowed to determine whether the detection information output from the document detecting sensors 15L and 15R satisfies the first state or the second state. It is noted that the control process is a process of controlling the conveying operation and the reading operation based on the detection information output from the multi-feed detector 13 and the detection information output from the document detecting sensors 15L and 15R. Further, the conveyed object is identified as a document sheet. Therefore, there is no need to determine whether the detection information output from the document detecting sensors 15L and 15R satisfies the first state or the second state. Thus, after continuing the conveying operation and the reading operation, the controller 20 determines whether a plurality of conveyed objects are being conveyed in a mutually-overlapping manner (i.e., whether multi-feed is occurring) based on the detection information output from the multi-feed detector 13, until the controller 20 determines that there is not any conveyed object based on the detection information output from the document detecting sensors 15L and 15R. When determining that a plurality of conveyed objects are being conveyed in a mutually-overlapping manner, the controller 20 halts at least one of the conveying operation and the reading operation, regardless of whether the detection information output from the document detecting sensors 15L and 15R satisfies the first state or the second state. Thereby, the second document sheet drawn to the first document sheet is not read.

Further, when determining that there is a conveyed object based on the detection information output from the document detecting sensors 15L and 15R after having once determined that there is not any conveyed object based on the detection information output from the document detecting sensors 15L and 15R, the controller 20 again executes the conveying operation and the reading operation. Thereby, the controller 20 executes the conveying operation and the reading operation for each of document sheets to be successively read. Further, the controller 20 controls the reading unit 16 to successively read the document sheets, while identifying for each conveyed object whether a currently conveyed object is a document sheet or the carrier sheet 40 with a document sheet held therein.

Suppose for instance that the carrier sheet 40 has a hole formed therein (instead of the cutout 41) and that the document detector 15 detects the hole of the carrier sheet 40. The higher a conveyance speed of the document conveyor (e.g., the pickup roller 11, the feed rollers 14, and the discharge rollers 17) is, the shorter a time period is between a point of time when the rotatable element 15A comes into contact with the hole and a point of time when the rotatable element 15A completes the contact and begin to separate from the hole. Hence, the photo-coupler 15B of the document detector 15 might not detect the rotation of the rotatable element 15A. In this case, in the control process, the controller 20 might mistakenly determine that a plurality of document sheets, each of which is not held in the carrier sheets 40, are being conveyed in a mutually-overlapping manner. Thus, in this case, the document sheet held in the carrier sheet 40 having the hole might not be read. In view of the above problem, according to the image reader 1 of the illustrative embodiment, the carrier sheet 40 has the cutout 41 formed at the leading end portion 40A that is a bonded portion of the two transparent sheets. The detection information output from the document detecting sensors 15L and 15R includes a detection point of time (detection timing) when the rotatable element 15A of the document detecting sensor 15L comes into contact with the cutout 41 of the carrier sheet 40, and a detection point of time (detection timing) when the rotatable element 15A of the document detecting sensor 15R comes into contact with a part of the leading end portion 40A where the cutout 41 is not formed. The controller 20 performs a predetermined control process based on the detection points of time. Thereby, it is possible to more accurately detect the detection timing when the rotatable element 15A of the document detecting sensor 15L comes into contact with the cutout 41 of the carrier sheet 40 and the detection timing when the rotatable element 15A of the document detecting sensor 15R comes into contact with a part of the leading end portion 40A where the cutout 41 is not formed. Thus, it is possible to discriminate the carrier sheet 40 with a document sheet held therein from a document sheet not held in the carrier sheet 40, and to read the document sheet held in the carrier sheet 40.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

<Modification>

(1) In the aforementioned illustrative embodiment, aspects of the present disclosure are applied to the image reader 1. Nevertheless, aspects of the present disclosure may be applied to other apparatuses such as a facsimile machine, a copy machine, an image scanner, and a multi-function peripheral having at least two of a facsimile function, a copy function, and an image reading function.

(2) In the aforementioned illustrative embodiment, the document separator 12 is a plate-shaped member. Nevertheless, the document separator 12 may be a reversing roller configured to rotate in a rotational direction opposite to a rotational direction of the pickup roller 11. In this case, the document separator 12 may be disposed to face the pickup roller 11 across the conveyance path 30. The document separator 12 may be configured to separate document sheets on a sheet-by-sheet basis by action of a frictional force.

(3) In the aforementioned illustrative embodiment, the multi-feed detector 13 is a supersonic sensor. Nevertheless, the multi-feed detector 13 may be an infrared sensor. In this case, in the same manner as when the multi-feed detector 13 is a supersonic sensor, the controller 20 (the CPU 21) may be configured to determine whether multi-feed is occurring, by determining whether an attenuation amount, which is determined based on an amplitude of infrared radiation varying depending on the number of document sheets, is more than a predetermined threshold indicating occurrence of multi-feed.

(4) In the aforementioned illustrative embodiment, the document detector 15 is disposed at the upper portion 4 of the main body 2. Nevertheless, the document detector 15 may be disposed at the lower portion 5 of the main body 2.

(5) In the aforementioned illustrative embodiment, the document detector 15 is a contact-type sensor. Nevertheless, the document detector 15 may be an optical sensor or a magnetic sensor. Further, instead of the cutout 41, a hole may be formed in the carrier sheet 40. Suppose, for instance, that the image reader 1 includes an optical sensor as the document detector 15, and that a hole is formed in the carrier sheet 40, instead of the cutout 41. In this case, after the optical sensor 15 has detected a leading end of the carrier sheet 40, the optical sensor 15 is once brought into a state where the document detecting sensor 15L does not detect the carrier sheet 40 because of existence of the hole formed in the carrier sheet 40. Thereafter, the document detecting sensor 15L detects the carrier sheet 40 again. Thus, the controller 20 (the CPU 21) is allowed to determine whether the currently conveyed object is the carrier sheet 40, based on appearance patterns of the document-leading-end detection timing and the document-trailing-end detection timing, in the same manner as exemplified in the aforementioned illustrative embodiment.

(6) In the aforementioned illustrative embodiment, if the leading end portion 40A of the carrier sheet 40 has a hole instead of the cutout 41, the CPU 21 may determine whether the currently conveyed object is a document sheet (i.e., the detection information satisfies the first state) or the carrier sheet 40 with a document sheet held therein (i.e., the detection information satisfies the second state), based on an appearance pattern of document-leading-end detection timings and document-trailing-end detection timings. Suppose, for instance, that the CPU 21 simultaneously detects a document-leading-end detection timing of the document detecting sensor 15L and a document-leading-end detection timing of the document detecting sensor 15R, and thereafter, the CPU 21 detects a document-trailing-end detection timing and a document-leading-end detection timing of the document detecting sensor 15R, in the above order. In this case, the CPU 21 receives, from the document detector 15 (more specifically, from the document detecting sensor 15R), the detection information showing such a predetermined detection pattern that the ON information and the OFF information are switched. When determining that the currently conveyed object has a hole, based on the predetermined detection pattern, the CPU 21 makes a negative determination in S102 (S102: No) of the process shown in FIGS. 6A and 6B. Meanwhile, when the CPU 21 simultaneously detects a document-leading-end detection timing of the document detecting sensor 15L and a document-leading-end detection timing of the document detecting sensor 15R, and thereafter, the CPU 21 does not detect the predetermined detection pattern, the CPU 21 determines that the currently conveyed object does not have a hole. In this case, the CPU 21 makes an affirmative determination in S102 (S102: Yes).

It is noted that a case where any of the document detecting sensors 15L and 15R does not detect the predetermined detection pattern is an example of the first state. Further, a case where one of the document detecting sensors 15L and 15R detects the predetermined detection pattern is an example of the second state.

Further, in the modification (6), the determination in S102 may be made based on whether there is a time period during which the detection information output from the document detecting sensor 15L is different from the detection information output from the document detecting sensor 15R, during a detectable time period from a point of time when the leading end of the conveyed object has been detected. It is noted that the detectable time period is a time period determined based on a conveyance speed of the carrier sheet 40 in the conveyance direction and a length of the leading end portion 40A having the hole in the conveyance direction. The detectable time period may previously be stored in the ROM 22.

(7) In the aforementioned illustrative embodiment, the document detecting sensors 15L and 15R are arranged apart from each other along the left-to-right direction perpendicular to the conveyance direction. Nevertheless, the document detecting sensors 15L and 15R may be arranged apart from each other along a direction that is not perpendicular to but intersecting the conveyance direction. In this case, the determination in S102 as to whether the document-leading-end detection timing of the document detecting sensor 15L is coincident with the document-leading-end detection timing of the document detecting sensor 15R may be made on the basis of a determination criteria that varies depending on a positional relationship between the document detecting sensors 15L and 15R. Suppose, for instance, that a document sheet not held in the carrier sheet 40 is conveyed, and that a time difference between the document-leading-end detection timings of the document detecting sensors 15L and 15R is 0.03 seconds. In this case, information on the time difference "0.03 seconds" may previously be stored in the ROM 22. To an earlier one of the document-leading-end detection timings of the document detecting sensors 15L and 15R, 0.03 seconds may be added. The CPU 21 may determine whether a timing obtained by adding 0.03 seconds to the earlier one of the document-leading-end detection timings is coincident with a later one of the document-leading-end detection timings. When determining that the timing obtained by adding 0.03 seconds to the earlier one of the document-leading-end detection timings is coincident with a later one of the document-leading-end detection timings (S102: Yes), the CPU 21 may go to S110. Meanwhile, when determining that the timing obtained by adding 0.03 seconds to the earlier one of the document-leading-end detection timings is different from the later one of the document-leading-end detection timings (S102: No), the CPU 21 may go to S120. It is noted that the case where the timing obtained by adding 0.03 seconds to the earlier one of the document-leading-end detection timings is coincident with the later one of the document-leading-end detection timings is an example of the first state. Further, the case where the timing obtained by adding 0.03 seconds to the earlier one of the document-leading-end detection timings is different from the later one of the document-leading-end detection timings is an example of the second state.

(8) In the aforementioned illustrative embodiment, the document detecting sensors 15L and 15R are arranged apart from each other along the left-to-right direction perpendicular to the conveyance direction. Nevertheless, the document detecting sensors 15L and 15R may be arranged apart from each other along a direction that is not perpendicular to but intersecting the conveyance direction. Further, the carrier sheet 40 may have a hole instead of the cutout 41. In this case, suppose, for instance, that a document sheet not held in the carrier sheet 40 is conveyed, and that a time difference between the document-leading-end detection timings of the document detecting sensors 15L and 15R is 0.03 seconds, as exemplified in the modification (7). In this case, information on the time difference "0.03 seconds" may previously be stored in the ROM 22. To an earlier one of the document-leading-end detection timings of the document detecting sensors 15L and 15R, 0.03 seconds may be added.

Further, when the carrier sheet 40 having a hole is conveyed, in addition to the above operations, the CPU 21 may determine whether the currently conveyed object is a document sheet or the carrier sheet 40 with a document sheet held therein, based on an appearance pattern of document-leading-end detection timings and document-trailing-end detection timings, in the same manner as exemplified in the modification (6). Suppose, for instance, that the CPU 21 simultaneously detects a document-leading-end detection timing of the document detecting sensor 15L and a document-leading-end detection timing of the document detecting sensor 15R, and thereafter, the CPU 21 detects a document-trailing-end detection timing and a document-leading-end detection timing of the document detecting sensor 15R, in the above order. In this case, the CPU 21 receives, from the document detector 15 (more specifically, from the document detecting sensor 15R), the detection information showing such a predetermined detection pattern that the ON information and the OFF information are switched. When detecting the predetermined detection pattern, the CPU 21 determines that the currently conveyed object has a hole, and makes a negative determination in S102 (S102: No). Meanwhile, when the CPU 21 simultaneously detects a document-leading-end detection timing of the document detecting sensor 15L and a document-leading-end detection timing of the document detecting sensor 15*k*, and thereafter, the CPU 21 does not detect the predetermined detection pattern, the CPU 21 determines that the currently conveyed object does not have a hole. In this case, the CPU 21 makes an affirmative determination in S102 (S102: Yes). It is noted that a case where any of the document detecting sensors 15L and 15R does not detect the predetermined detection pattern is an example of the first state. Further, a case where one of the document detecting sensors 15L and 15R detects the predetermined detection pattern is an example of the second state.

(9) In the aforementioned illustrative embodiment and the modifications (6), (7), and (8), examples of the determination in S102 have been cited. The examples of the determination in S102 may be examples of a determination as to whether a detection information generating state is the first state or the second state. Further, the affirmative determination in S102 (S102: Yes) may be an example of a determination that the detection information generating state is the first state. The negative determination in S102 (S102: No) may be an example of a determination that the detection information generating state is the second state. It is noted that a case where the detection information generating state is the first state may represent a case where a document sheet not held in the carrier sheet 40 is conveyed. Meanwhile, a case where the detection information generating state is the second state may represent a case where a document sheet held in the carrier sheet 40 is conveyed, and detection information is generated based on the cutout 41 or the hole of the carrier sheet 40.

(10) In the aforementioned illustrative embodiment, the reading operation may include S120 and S121, and S111 and S112 to be executed by the CPU 21. To "halt the reading operation" may represent execution of S115, S123, or S140 by the CPU 21. To "continue the reading operation" may represent that the CPU 21 does not transmit to the reading unit 16 a turn-off instruction to turn off the light source 51, or may represent that the CPU 21 transmits a reading continuing instruction to the reading unit 16. Anyway, the expression "continue the reading operation" only requires that document reading is continued. Further, the conveying operation may include S100 to be executed by the CPU 21. To "halt the conveying operation" may represent execution of S116, S124, or S130 by the CPU 21. To "continue the conveying operation" may represent that the CPU 21 does not transmit a conveyance halting instruction to the driving unit 53, or may represent that the CPU 21 transmits a conveyance continuing instruction to the driving unit 53. Anyway, the expression "continue the conveying operation" only requires that document conveyance is continued.

(11) In the aforementioned illustrative embodiment, when determining that a plurality of document sheets are being conveyed in a mutually-overlapping manner, the CPU 21 halts the reading operation in S140 and halts the conveying operation in S130. However, when determining that a plurality of document sheets are being conveyed in a mutually-overlapping manner, the CPU 21 may halt at least one of the reading operation and the conveying operation. For instance, when the reading operation is halted, and the conveying operation is continued, the document sheet may be conveyed downstream in the conveyance direction and discharged out of the main body 2 by the discharge rollers 17, without being read. Further, when the reading operation is continued, and the conveying operation is halted, read data may be stored or deleted.

(12) As exemplified in the modification (11), when the reading operation is halted, and the conveying operation is continued, the document sheet may be conveyed downstream in the conveyance direction and discharged out of the main body 2 by the discharge rollers 17, without being read. Nevertheless, when the reading operation is halted, and the conveying operation is continued, the document sheet may be conveyed to the document tray 3 in an upstream position in the conveyance direction, by the driving unit 53 being reversely rotated.

(13) In the aforementioned illustrative embodiment, the CPU 21 terminates the process shown in FIGS. 6A and 6B after transmitting the conveyance halting instruction to the driving unit 53 (S130) in response to determining that multi-feed is occurring (S110: Yes). Nevertheless, the CPU 21 may not terminate the process shown in FIGS. 6A and 6B after transmitting the conveyance halting instruction to the driving unit 53 in response to determining that multi-feed is occurring. In this case, the CPU 21 may resume the process shown in FIGS. 6A and 6B in accordance with information input through an operation of the switches 6.

(14) In the aforementioned illustrative embodiment, the conveyance area between the two side guides 10 is defined to have a left section and a right section of the same width in the left-to-right direction with respect to a center of the conveyance path 30 in the left-to-right direction. In other words, a left end and a right end of the conveyance area defined between the two side guides 10 are positioned the same distance away, in respective different directions along the left-to-right direction, from the center of the conveyance path 30 in the left-to-right direction. Nevertheless, one of the two side guides 10 may be fixedly positioned, and the conveyance area may be defined on the basis of the fixedly-positioned side guide 10. In this case, the two document detecting sensors 15L and 15R may be disposed between a left end and a right end of the conveyance area defined when the two side guides 10 are positioned closest to each other on the basis of the fixedly-positioned side guide 10.

(15) In the aforementioned illustrative embodiment, between the left end 34L and the right end 34R of the conveyance area defined by the two side guides 10 when the two side guides 10 are positioned closest to each other in their respective movable areas 32, the two document detecting sensors 15L and 15R are arranged along the left-to-right direction perpendicular to the conveyance direction. Further, the two document detecting sensors 15L and 15R are positioned the same distance away, in respective different directions along the left-to-right direction, from the middle point of the length of the document tray 3 in the left-to-right direction. Nevertheless, the document detecting sensors 15L and 15R may be arranged apart from each other along a direction intersecting the conveyance direction, in the conveyance area defined when the two side guides 10 are positioned farthest from each other in their respective movable areas 32. Further, when there is not any conveyed object detected by the document detector 15, the CPU 21 may determine that a document sheet not held in the carrier sheet 40 is being conveyed, i.e., may make an affirmative determination in S102 (S102: Yes), and may go to S110.

(16) In the aforementioned illustrative embodiment, the multi-feed detector 13 is disposed upstream in the conveyance direction relative to the document detector 15. However, the document detector 15 may be disposed upstream in the conveyance direction relative to the multi-feed detector 13. In this case, a point of time when the CPU 21 is to transmit the turn-on instruction to the light source 51 in S111 and S120 may be delayed by a conveyance time period. It is noted that the conveyance time period may be a time period from a point of time when the document sheet or the carrier sheet 40 is detected by the document detector 15 to a point of time when the document sheet or the carrier sheet 40 reaches the reading unit 16. Alternatively, when the document sheet or the carrier sheet 40 is detected by the document detector 15, the CPU 21 may transmit the turn-on instruction to the light source 51. Then, after the reading operation, the CPU 21 may delete, from read data in the reading operation, a partial data section generated when the reading unit 16 was not reading the document sheet or the document sheet held in the carrier sheet 40.

(17) In the aforementioned illustrative embodiment, in S110 and S113, the CPU 21 determines whether a plurality of document sheets are being conveyed in a mutually-overlapping manner (i.e., whether multi-feed is occurring) by comparing the attenuation amount based on the amplitude information received from the multi-feed detector 13 with the threshold representing occurrence of multi-feed. Nevertheless, the CPU 21 may determine whether a plurality of document sheets are being conveyed in a mutually-overlapping manner by comparing the amplitude information received from the multi-feed detector 13 with a threshold as an amplitude value representing occurrence of multi-feed. For example, the CPU 21 may compare an amplitude value specified by the amplitude information with the threshold that is the amplitude value representing occurrence of multi-feed. When determining that the amplitude value specified by the amplitude information is not more than the threshold as an amplitude value representing occurrence of multi-feed, the CPU 21 may determine that multi-feed is occurring. When determining that the amplitude value specified by the amplitude information is more than the threshold that is the amplitude value representing occurrence of multi-feed, the CPU 21 may determine that multi-feed is not occurring.

(18) In the aforementioned illustrative embodiment, the document detector 15 includes the two document detecting sensors 15L and 15R. However, the document detector 15 may include three or more document detecting sensors. For instance, when the document detector 15 includes three document detecting sensors, two of the document detecting sensors may detect the leading end portion 40A of the carrier sheet 40, and the other one document sensor may detect the cutout 41 of the carrier sheet 40. Thereby, it is possible to make a discrimination between the carrier sheet 40 and a document sheet and to automatically switch the operational mode.

(19) In the aforementioned illustrative embodiment, the reading unit 16 includes the CISs. Nevertheless, the reading unit 16 may include charge coupled devices (hereinafter referred to as "CCDs").

(20) According to aspects of the present disclosure, the two side guides 10 are provided, which are configured to move along the left-to-right direction perpendicular to the conveyance direction. Nevertheless, the two side guides 10 may be configured to move along a direction intersecting the conveyance direction at an angle of 90±0.5 degrees.

Advantageous Effects of Illustrative Embodiment

The document detecting sensors 15L and 15R are disposed the same distance away, in respective different directions along the left-to-right direction, from the middle point of the document tray 3 in the left-to-right direction. Further, the cutout 41 is formed in a position of the carrier sheet 40 corresponding to one of the document detecting sensors 15L and 15R. Suppose, for instance, that two surfaces of the carrier sheet 40 are defined as a first side and a second side opposite to the first side, respectively. In this case, the cutout 41 is detected by one of the document detecting sensors 15L and 15R regardless of whether an upward-facing side of the carrier sheet 40 being conveyed is the first side or the second side. Suppose, for instance, that the cutout 41 is formed in a position of the carrier sheet 40 corresponding to the document detecting sensor 15R when the carrier sheet 40 is conveyed with the first side thereof facing upward. In this case, even though the carrier sheet 40 is conveyed with the first side thereof facing downward, the cutout 41 is detected by the document detecting sensor 5L. Thereby, it is possible to read a document sheet held in the carrier sheet 40.

What is claimed is:

1. An image reader comprising:
    a conveyor configured to perform a conveying operation of conveying a conveyed object in a conveyance direction, the conveying object being one of a document sheet and a carrier sheet with a document sheet held therein;
    a first detector configured to output first detection information representing whether the conveyed object is in a multi-feed condition in which the conveyed object overlaps another conveyed object;
    a plurality of second detectors spaced apart from each other in a direction intersecting the conveyance direction, each second detector being configured to output second detection information representing whether there is an object being conveyed;
    a reading unit disposed downstream relative to the first detector and the plurality of second detectors in the conveyance direction, the reading unit being configured to perform a reading operation of reading an image of the conveyed object; and a controller configured to perform a control process of controlling the conveying operation by the conveyor and the reading operation by the reading unit, the control process comprising:

determining whether the second detection information output from the plurality of second detectors satisfies a predetermined state;

executing a first sequence when determining that the second detection information output from the plurality of second detectors satisfies the predetermined state, the first sequence comprising:

during a period in which the controller continues the conveying operation and the reading operation, determining whether the conveyed object is in the multi-feed condition, based on the first detection information output from the first detector, until a point of time when the controller determines that there is not an object being conveyed based on the second detection information output from the plurality of second detectors;

in response to determining that the conveyed object is in the multi-feed condition, halting at least one of the conveying operation and the reading operation, regardless of whether the second detection information output from the plurality of second detectors satisfies the predetermined state; and when determining that the conveyed object is not in the multi-feed condition, continuing the conveying operation and the reading operation;

executing a second sequence when determining that the second detection information output from the plurality of second detectors does not satisfies the predetermined state, the second sequence comprising:

continuing the conveying operation by the conveyor and the reading operation by the reading unit, regardless of the first detection information output from the first detector.

2. The image reader according to claim 1, further comprising two side guides configured to guide the conveyed object in the conveyance direction, at least one of the two side guides being movable in a direction perpendicular to the conveyance direction, wherein the plurality of second detectors comprise at least two second detectors disposed in a conveyance area defined between the two side guides in the conveyance direction when the two side guides are positioned closest to each other.

3. The image reader according to claim 1, wherein the controller is configured to resume the control process of controlling the conveying operation and the reading operation when determining that there is an object being currently conveyed based on the second detection information output from at least one of the plurality of second detectors, after determining that there is not an object being currently conveyed based on the second detection information output from the plurality of second detectors.

4. The image reader according to claim 1, wherein each of the plurality of second detectors comprises:

a rotatable element disposed to be rotatable around an axis perpendicular to the conveyance direction; and an optical sensor configured to detect rotation of the rotatable element.

5. The image reader according to claim 4, wherein the conveyor is configured to convey the carrier sheet with a bonded portion thereof directed downstream in the conveyance direction, the bonded portion of the carrier sheet being formed by bonding end portions of two transparent sheets together, the carrier sheet having a cutout formed at the bonded portion, wherein one of the plurality of second detectors is disposed to detect the cutout formed at the bonded portion of the carrier sheet in response to the rotatable element of the one second detector coming into contact with the cutout and rotates, and wherein another one of the plurality of second detectors is disposed to detect a non-cutout part of the bonded portion where the cutout is not formed, in response to the rotatable element of the another second detector coming into contact with the non-cutout part and rotates.

6. The image reader according to claim 5, wherein the controller is configured to determine that the second detection information output from the plurality of second detectors does not satisfy the predetermined state, when the second detection information output from the plurality of second detectors includes a point of time when the rotatable element of the one second detector has come into contact with the cutout and a point of time when the rotatable element of the another second detector has come into contact with the non-cutout part.

7. The image reader according to claim 1, wherein the first detector comprises an ultrasonic sensor.

8. An image reader comprising:

a conveyance roller configured to rotate to convey a medium to be read, along a conveyance direction;

an ultrasonic sensor;

a first sensor and a second sensor spaced apart from each other in a direction intersecting the conveyance direction;

a reading unit disposed downstream relative to the ultrasonic sensor, the first sensor, and the second sensor in the conveyance direction; and a controller configured to:

determine whether a time difference between a first timing and a second timing satisfies a predetermined relationship, the first timing being a point of time when the controller receives detection information from the first sensor, the second timing being a point of time when the controller receives detection information from the second sensor;

execute a first sequence in response to determining that the time difference between the first timing and the second timing satisfies the predetermined relationship, the first sequence comprising:

determining whether multi-feed is occurring based on detection information from the ultrasonic sensor; and stopping at least one of rotation of the conveyance roller and light emission from the reading unit in response to determining that the multi-feed is occurring; and execute a second sequence in response to determining that the time difference between the first timing and the second timing does not satisfy the predetermined relationship, the second sequence comprising:
    continuing the rotation of the conveyance roller and the light emission from the reading unit regardless the detection information from the ultrasonic sensor.

9. The image reader according to claim 8,
wherein the controller is configured to determine that the time difference between the first timing and the second timing satisfies the predetermined relationship when the first timing is coincident with the second timing.

10. A non-transitory computer-readable medium storing computer-readable instructions that are executable by a processor coupled with an image reader comprising:
- a conveyance roller configured to rotate to convey a medium to be read, along a conveyance direction;
- an ultrasonic sensor;
- a first sensor and a second sensor spaced apart from each other in a direction intersecting the conveyance direction; and
- a reading unit disposed downstream relative to the ultrasonic sensor, the first sensor, and the second sensor in the conveyance direction, the instructions being configured to, when executed by the processor, cause the processor to:
determine whether a time difference between a first timing and a second timing satisfies a predetermined relationship, the first timing being a point of time when the processor receives detection information from the first sensor, the second timing being a point of time when the processor receives detection information from the second sensor;

execute a first sequence in response to determining that the time difference between the first timing and the second timing satisfies the predetermined relationship, the first sequence comprising:
    determining whether multi-feed is occurring based on detection information from the ultrasonic sensor; and
    stopping at least one of rotation of the conveyance roller and light emission from the reading unit in response to determining that the multi-feed is occurring; and execute a second sequence in response to determining that the time difference between the first timing and the second timing does not satisfy the predetermined relationship, the second sequence comprising:
    continuing the rotation of the conveyance roller and the light emission from the reading unit regardless the detection information from the ultrasonic sensor.

11. The non-transitory computer-readable medium according to claim 10,
wherein the instructions are configured to, when executed by the processor, cause the processor to determine that the time difference between the first timing and the second timing satisfies the predetermined relationship when the first timing is coincident with the second timing.

* * * * *